US010422651B2

(12) United States Patent
Adachi et al.

(10) Patent No.: US 10,422,651 B2
(45) Date of Patent: Sep. 24, 2019

(54) ROUTE EVALUATION APPARATUS AND ROUTE EVALUATION METHOD

(71) Applicant: Mitsubishi Electric Corporation, Chiyoda-ku (JP)

(72) Inventors: Yoshiaki Adachi, Tokyo (JP); Masahiko Ikawa, Tokyo (JP); Hiroki Konaka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 95 days.

(21) Appl. No.: 15/567,246

(22) PCT Filed: Apr. 28, 2016

(86) PCT No.: PCT/JP2016/063417
§ 371 (c)(1),
(2) Date: Oct. 17, 2017

(87) PCT Pub. No.: WO2017/010143
PCT Pub. Date: Jan. 19, 2017

(65) Prior Publication Data
US 2018/0087917 A1 Mar. 29, 2018

(30) Foreign Application Priority Data

Jul. 15, 2015 (JP) ................. 2015-140932

(51) Int. Cl.
G01C 21/34 (2006.01)
G01C 21/36 (2006.01)

(52) U.S. Cl.
CPC ..... *G01C 21/3492* (2013.01); *G01C 21/3423* (2013.01); *G01C 21/3446* (2013.01); *G01C 21/3484* (2013.01); *G01C 21/3691* (2013.01)

(58) Field of Classification Search
CPC ............ G01C 21/3492; G01C 21/3423; G01C 21/3453

(Continued)

(56) References Cited

U.S. PATENT DOCUMENTS

2012/0158285 A1* 6/2012 Yamazaki .......... G01C 21/3461
701/410
2016/0290817 A1* 10/2016 Hoogland .......... G01C 21/3492

FOREIGN PATENT DOCUMENTS

JP 2005-77299 A 3/2005
JP 2005-77299 A5 3/2005

(Continued)

OTHER PUBLICATIONS

International Preliminary Report on Patentability and Written Opinion dated Jan. 25, 2018 in PCT/JP2016/063417 (with English language translation).

(Continued)

Primary Examiner — Isaac G Smith
(74) Attorney, Agent, or Firm — Oblon, McClelland, Maier & Neustadt, L.L.P.

(57) ABSTRACT

A route information acquisition unit acquires a waypoint information piece including a route information piece concerning a waypoint on a route from a departure place to a destination, from each external database device. A route reproduction unit reproduces each of acquired route information pieces in the format used in a route evaluation apparatus. On the basis of the evaluation criteria stored in an evaluation criterion storage unit, a route evaluation unit generates an evaluation result by calculating a time and a distance concerning a route including the waypoint represented by the waypoint information piece, and evaluates the (Continued)

route information pieces. A display control unit controls a display unit such that the display unit displays the generated evaluation result.

7 Claims, 19 Drawing Sheets

(58) Field of Classification Search
USPC .................................................. 701/414, 410
See application file for complete search history.

(56) References Cited

FOREIGN PATENT DOCUMENTS

| JP | 2006-300655 A |   | 11/2006 |
|----|---------------|---|---------|
| JP | 2006300655 A  | * | 11/2006 |
| JP | 2007-26296 A  |   | 2/2007  |
| JP | 2008-122183 A |   | 5/2008  |
| JP | 2010-261802 A |   | 11/2010 |
| JP | 2012-127770 A |   | 7/2012  |
| JP | 2014-2717 A   |   | 1/2014  |

OTHER PUBLICATIONS

International Search Report dated Aug. 9, 2016, in PCT/JP2016/063417 filed Apr. 28, 2016.

* cited by examiner

F I G. 1
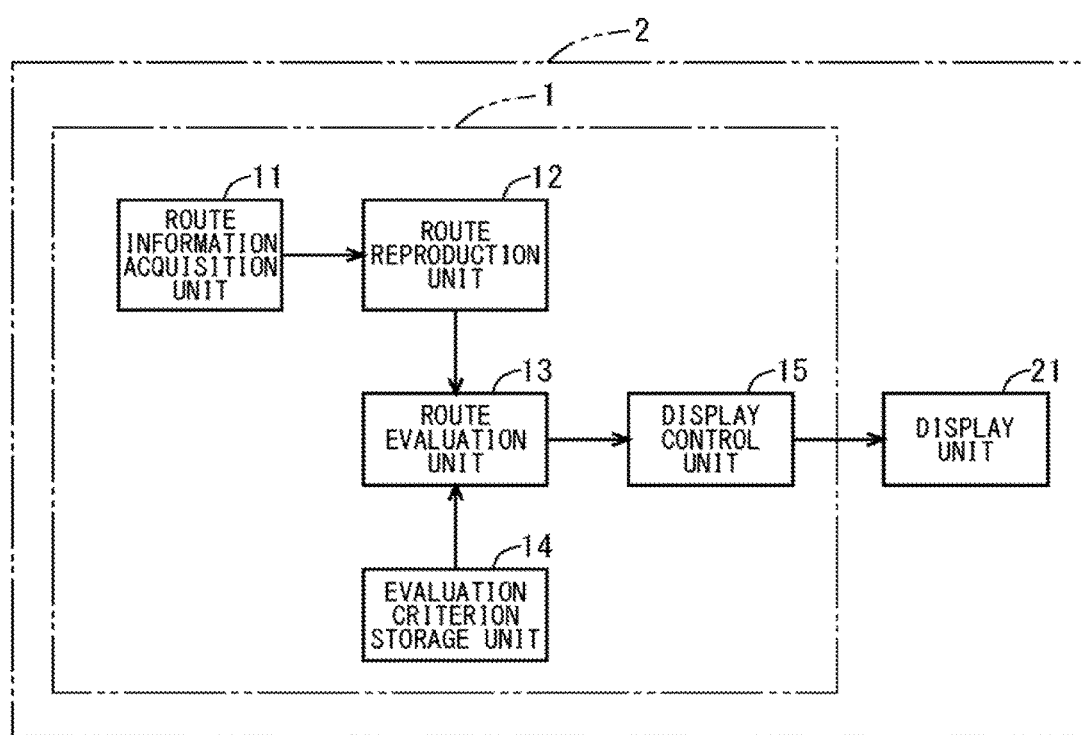

F I G. 3
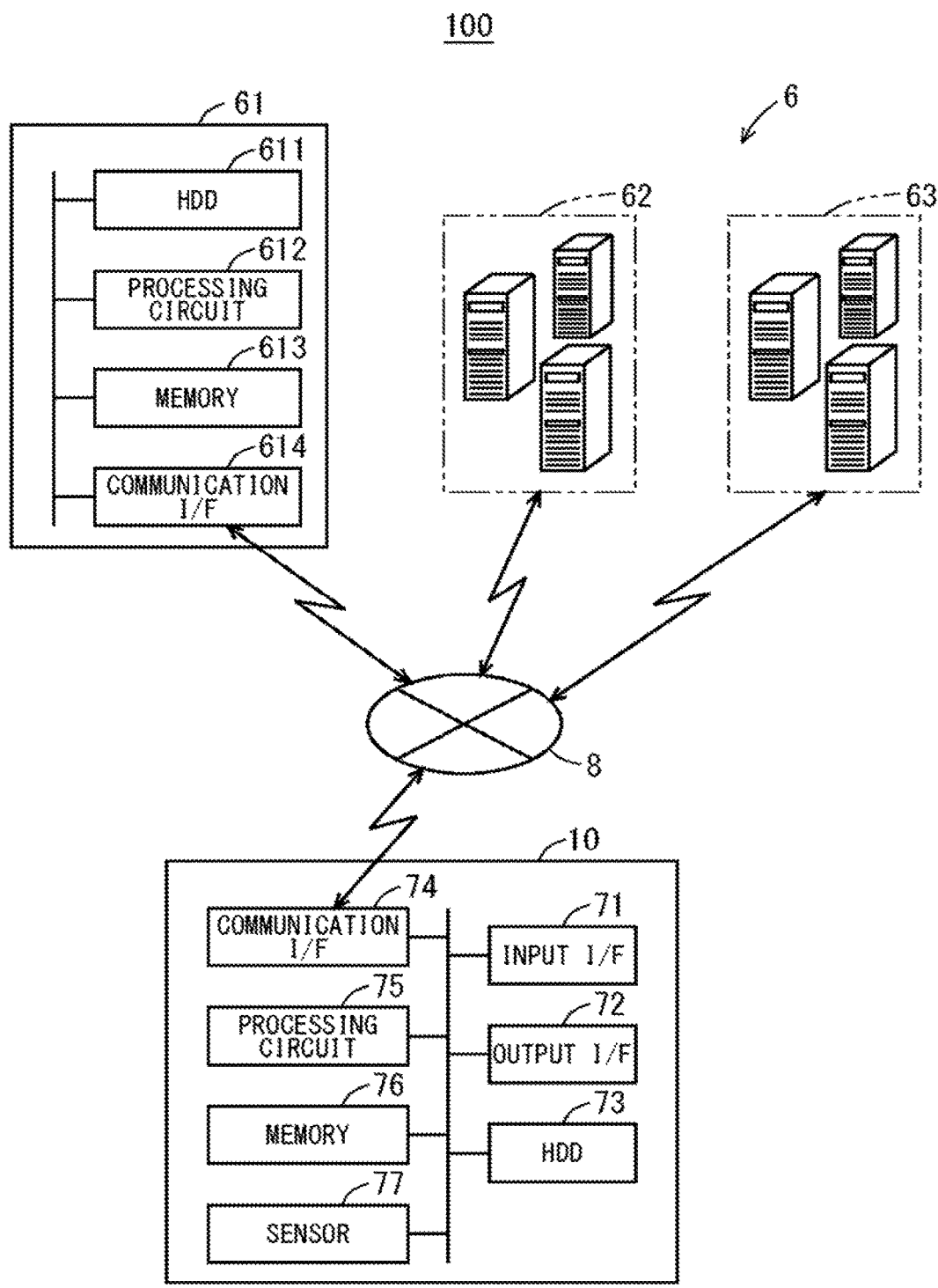

FIG. 4

| NAME OF VARIABLE | EXPLANATION | EXAMPLE |
|---|---|---|
| Velocity | VELOCITY RATIO RELATIVE TO ROAD LINK VELOCITY LIMIT | 1.0 |
| Consumption | FUEL ECONOMY: TRAVEL DISTANCE [km] PER 1L | 10 |
| Weight | VEHICLE WEIGHT: EMPTY VEHICLE BODY WEIGHT [kg] | 1500 |
| SkillLevel | DRIVING SKILL: FOR EXAMPLE, THREE LEVELS OF EVALUATION ARE PREPARED | 3 |
| TrafficInfo | CONSIDERATION/NON-CONSIDERATION OF TRAFFIC INFORMATION PIECES: INDICATING WHETHER TO CONSIDER TRAFFIC INFORMATION PIECES WHEN EVALUATING TRAVEL TIME, FUEL CONSUMPTION, etc. | YES |
| TrafficSignal | CONSIDERATION/NON-CONSIDERATION OF TRAFFIC SIGNAL: INDICATING WHETHER TO CONSIDER STOPPAGE TIME AT SIGNAL WHEN EVALUATING TRAVEL TIME, FUEL CONSUMPTION, etc. | YES |
| SlopeWay | CONSIDERATION/NON-CONSIDERATION OF SLOPES: INDICATING WHETHER TO CONSIDER SLOPES WHEN EVALUATING TRAVEL TIME, FUEL CONSUMPTION, etc. | YES |
| ... | ... | ... |

F I G . 8
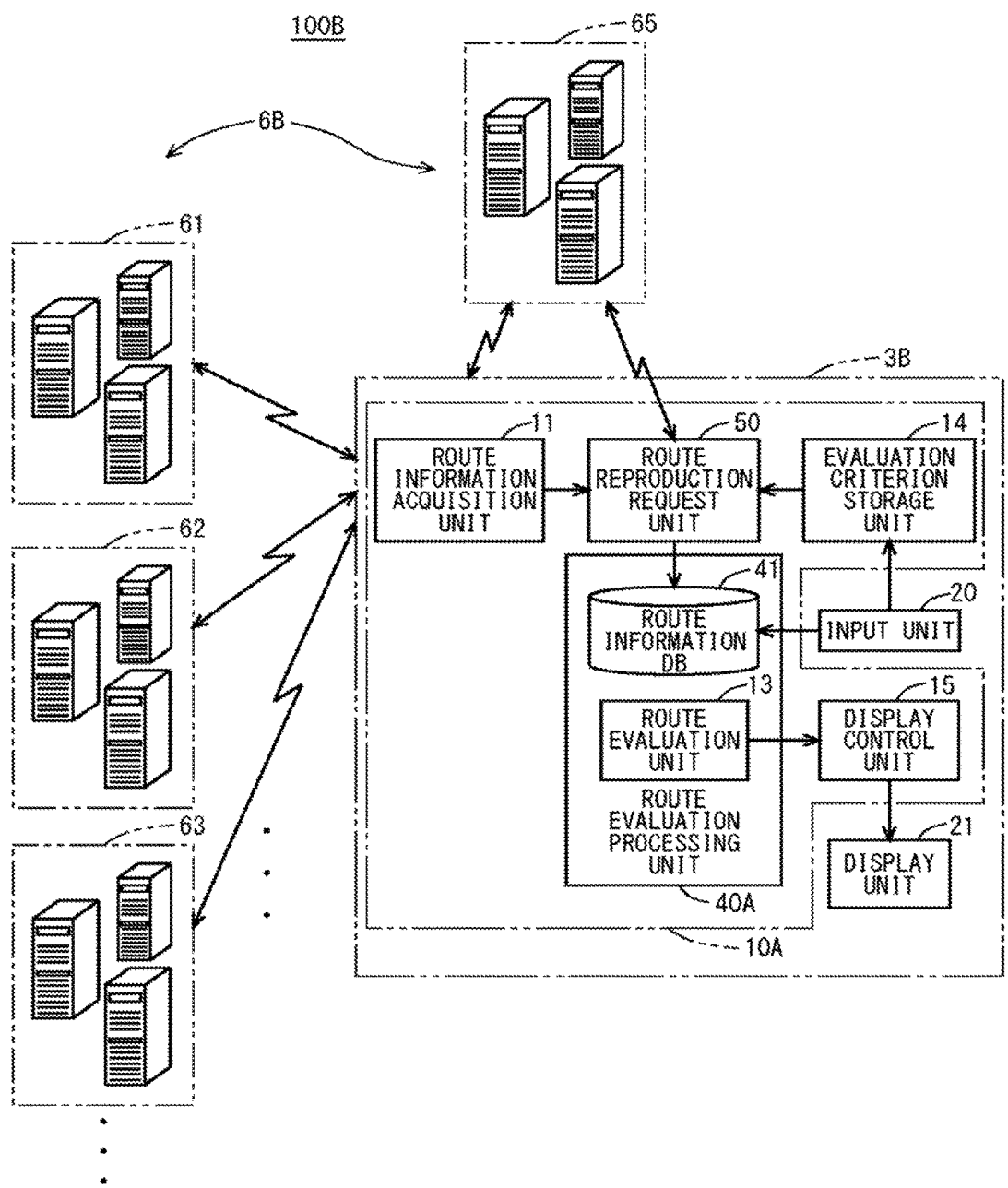

F I G. 9
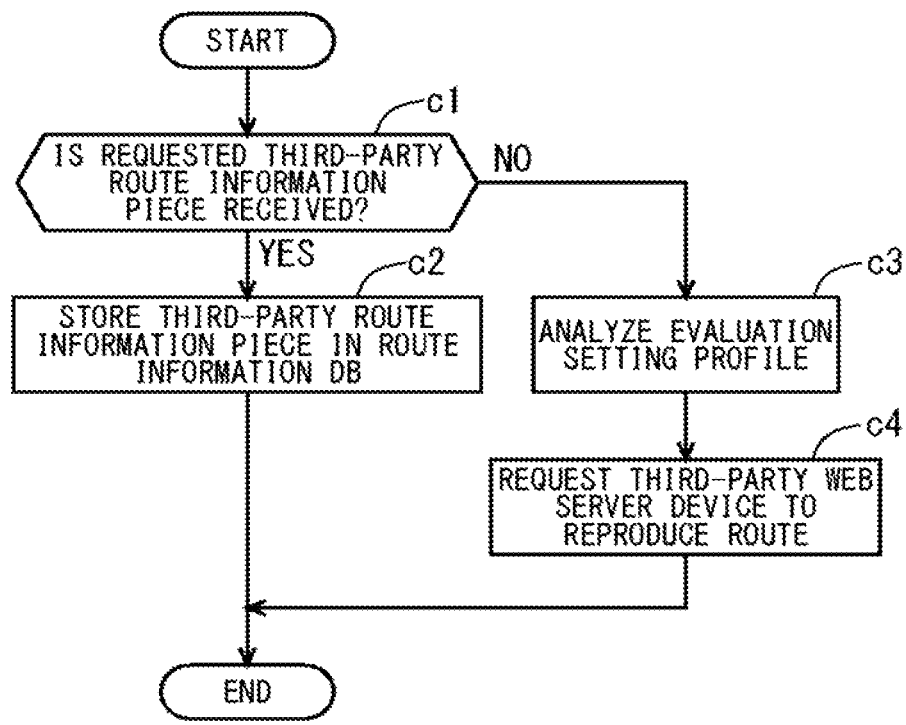

F I G . 1 3

| ITEM | | ATTRIBUTE VALUE |
|---|---|---|
| DEPARTURE PLACE | | P PREFECTURE, Q CITY, R TOWN, XXX |
| DESTINATION | | P PREFECTURE, J CITY, K TOWN, XXX |
| MOVING DISTANCE | | 50km |
| MOVING TIME | | 120 min |
| MOVING COST | | 3000 YEN |
| WAYPOINT 1 | WAYPOINT | T STATION |
| | TRANSPORT MEANS | VEHICLE |
| WAYPOINT 2 | WAYPOINT | S STATION |
| | TRANSPORT MEANS | CCC RAILROAD |
| WAYPOINT 3 | WAYPOINT | H STATION |
| | TRANSPORT MEANS | DDD RAILROAD |
| WAYPOINT 4 | WAYPOINT | S TOWN BUS STOP |
| | TRANSPORT MEANS | EEE BUS |
| WAYPOINT 5 | WAYPOINT | P PREFECTURE, J CITY, K TOWN, XXX |
| | TRANSPORT MEANS | VEHICLE |

F I G . 1 4

| ITEM | EVALUATION VALUE |
|---|---|
| DEPARTURE PLACE | P PREFECTURE, Q CITY, R TOWN, XXX |
| DESTINATION | P PREFECTURE, J CITY, K TOWN, XXX |
| MOVING DISTANCE | 55km |
| MOVING TIME | 118 min |
| MOVING COST | 3320 YEN |

F I G . 1 5

| TRANSPORT MEANS CLASSIFICATION | TRANSPORT MEANS |
|---|---|
| WALKING | WALKING |
|  | BICYCLE |
| VEHICLE | VEHICLE |
| BUS | AAA BUS |
|  | BBB BUS |
|  | ... |
| RAILROAD | CCC RAILROAD |
|  | DDD RAILROAD |
|  | ... |
| OTHERS | EEE BUS |
|  | ... |

F I G . 1 6

| DEPARTURE PLACE | P PREFECTURE, Q CITY, R TOWN, XXX |
|---|---|
| DESTINATION | T STATION |
| TRANSPORT MEANS /CLASSIFICATION | VEHICLE |

F I G . 1 7

| DEPARTURE PLACE | T STATION |
|---|---|
| WAYPOINT | S STATION |
| DESTINATION | H STATION |
| TRANSPORT MEANS /CLASSIFICATION | RAILROAD |

F I G . 1 8

| DEPARTURE PLACE | H STATION |
|---|---|
| DESTINATION | S TOWN BUS STOP |
| TRANSPORT MEANS/CLASSIFICATION | EEE BUS |

F I G . 1 9

| DEPARTURE PLACE | S TOWN BUS STOP |
|---|---|
| DESTINATION | P PREFECTURE, J CITY, K TOWN, XXX |
| TRANSPORT MEANS/CLASSIFICATION | VEHICLE |

F I G. 2 0

| TRANSPORT MEANS /CLASSIFICATION | SERVICE NAME | ACCESS DESTINATION | REQUIRED ITEM ||||| 
| --- | --- | --- | --- | --- | --- | --- | --- |
| | | | DEPARTURE PLACE | DESTINATION | WAYPOINT | TRANSPORT MEANS | DEPARTURE TIME |
| WALKING | FFF ROUTE GUIDANCE | http://fff.route.xxxx/ | src | dst | point | way | --- |
| VEHICLE | OWN DEVICE | OWN DEVICE | --- | --- | --- | --- | --- |
| BUS | GGG BUS GUIDANCE | http://GGG.Bus.xxxx/ | start | goal | waypoint | --- | time |
| RAILROAD | HHH RAILROAD SERVICE | http://HHH.Express.xxxx/ | source | destination | waypoint | --- | arrival |
| EEE BUS | EEE BUS GUIDANCE SERVICE | http://EEE.Bus.xxxx/ | GETTING ON | GETTING OFF | --- | --- | TIME |

F I G. 21

| TRANSPORT MEANS /CLASSIFICATION | TRANSPORT MEANS TRANSFER TIME | EXTRACTION ITEM | | | |
|---|---|---|---|---|---|
| | | MOVING DISTANCE | MOVING TIME | MOVING COST | ARRIVAL TIME |
| WALKING | 1 min | distance | traveltime | cost | arrivaltime |
| VEHICLE | 3 min | — | — | — | — |
| BUS | 5 min | MOVING DISTANCE | RIDE TIME | FARE | ARRIVAL TIME |
| RAILROAD | 3 min | RIDE DISTANCE | RIDE TIME | TOTAL AMOUNT | ARRIVAL TIME |
| EEE BUS | 5 min | dist | time | fare | arrive |

FIG. 22

| DEPARTURE PLACE | P PREFECTURE, Q CITY, R TOWN, XXX |
|---|---|
| DESTINATION | T STATION |
| MOVING DISTANCE | 2km |
| MOVING TIME | 5 min |
| MOVING COST | 200 YEN |

FIG. 23

| DEPARTURE PLACE | T STATION |
|---|---|
| WAYPOINT | S STATION |
| DESTINATION | H STATION |
| MOVING DISTANCE | 48km |
| MOVING TIME | 90 min |
| MOVING COST | 2800 YEN |

FIG. 24

| DEPARTURE PLACE | H STATION |
|---|---|
| DESTINATION | S TOWN BUS STOP |
| MOVING DISTANCE | 4km |
| MOVING TIME | 10 min |
| MOVING COST | 220 YEN |

F I G . 2 5

| DEPARTURE PLACE | S TOWN BUS STOP |
|---|---|
| DESTINATION | P PREFECTURE, J CITY, K TOWN, XXX |
| MOVING DISTANCE | 1km |
| MOVING TIME | 3 min |
| MOVING COST | 100 YEN |

ROUTE EVALUATION APPARATUS AND ROUTE EVALUATION METHOD

TECHNICAL FIELD

The present invention relates to a route evaluation apparatus and a route evaluation method that acquire route information pieces from external devices such as a plurality of Web server devices or external database devices and evaluate the acquired route information pieces.

BACKGROUND ART

For example, there is available a navigation device that acquires information pieces from external devices such as Web server devices installed by third parties (to be referred to as "third-party Web server devices" hereinafter) or external database devices and provides the information pieces to a user. The third-party Web server device delivers facility information pieces concerning facilities, route information pieces concerning routes, traffic information pieces concerning traffic, and the like. An external database device stores the facility information pieces, route information pieces, traffic information pieces, and the like. Route information pieces include, for example, information pieces such as courses, travel times, and travel distances. Traffic information pieces include, for example, information pieces such as traffic jams, travel times, construction activities, and accidents.

The navigation device provides the user with, for example, a plurality of information pieces acquired from external devices such as a plurality of third-party Web server devices or external database devices. The navigation device disclosed in Patent Document 1 converts a plurality of information pieces having data formats different from each other into information pieces in a common data format and displays the information pieces arranged on a window, thereby providing the plurality of information pieces to the user.

The integrated search processing device disclosed in Patent Document 2 discloses as a navigation device that can search for the information pieces acquired from external devices such as a plurality of third-party Web server devices or external database devices and the information pieces from the navigation device. The navigation device disclosed in Patent Document 2 converts the information pieces from the external devices such as third-party Web server devices or external database devices into information pieces in a common data format, and integrates the information pieces from the external devices with the information pieces from the navigation device into one information piece, thereby providing the resultant information piece to the user.

PRIOR ART DOCUMENTS

Patent Documents

Patent Document 1: Japanese Patent Application Laid-Open No. 2014-2717
Patent Document 2: Japanese Patent Application Laid-Open No. 2007-26296

SUMMARY

Problems to be Solved by the Invention

When the navigation devices disclosed in Patent Documents 1 and 2 described above each provide the user with the route information pieces acquired from the external devices such as a plurality of third-party Web server devices or external database devices, the route information pieces acquired from the external devices such as the plurality of third-party Web server devices or the external database devices can be information pieces generated by searches using different algorithms on the basis of different map information pieces and traffic information pieces. Thus, this poses a problem that the user cannot simply compare a plurality of route information pieces.

It is an object of the present invention to provide a route evaluation apparatus and a route evaluation method that can fairly compare and evaluate a plurality of information pieces acquired from external devices such as a plurality of third-party Web server devices or external database devices.

Means to Solve the Problems

A route evaluation apparatus according to the present invention is a route evaluation apparatus for acquiring and evaluating route information pieces concerning routes from a plurality of external database devices installed outside, the route evaluation apparatus including a route information acquisition unit that acquires the route information pieces from each of the external database devices, a route reproduction unit that reproduces each of the route information pieces acquired by the route information acquisition unit in a format used inside an own apparatus, a route information dividing unit that divides the route information pieces generated by the reproduction by the route reproduction unit into interval information pieces according to differences in transport means for each of the waypoints from a departure place to a destination, a route evaluation request unit that decides a processing unit to evaluate the interval information pieces in accordance with the transport means in the interval information pieces and requests the decided processing unit to evaluate the interval information pieces, an evaluation criterion storage unit that stores evaluation criteria for evaluating the interval information pieces generated by the route information dividing unit, a route evaluation unit that evaluates the interval information pieces generated by the route information dividing unit based on the evaluation criteria stored in the evaluation criterion storage unit, an evaluation result combining unit that generates an evaluation result on the route information pieces by combining evaluation results on each of the interval information pieces, the evaluation results being generated by the processing unit in accordance with a request issued by the route evaluation request unit, and a display control unit that controls a display unit such that the display unit displays an evaluation result on each of the route information pieces, the evaluation result being generated by combining by the evaluation result combining unit, wherein each of the route information pieces includes a waypoint information piece concerning a waypoint on each of the routes from the departure place to the destination, the route information pieces include information pieces of transport means for the waypoint, the route evaluation request unit decides the processing unit from a plurality of external information processing server devices and the route evaluation unit that are set for each of the transport means, and the decided processing unit generates the evaluation result by calculating a time and a distance concerning a route including a waypoint represented by the waypoint information piece based on the evaluation criteria.

A route evaluation method according to the present invention is a route evaluation method of acquiring and evaluating route information pieces concerning routes from a plurality of external database devices, the route evaluation method including acquiring the route information pieces including waypoint information pieces concerning waypoints on the routes from a departure place to a destination from each of the external database devices, reproducing each of the acquired route information pieces in a format used inside a route evaluation apparatus, dividing the reproduced route information pieces into interval information pieces according to differences in transport means for each of the waypoints from a departure place to a destination, deciding a processing unit to evaluate the interval information pieces in accordance with the transport means in the interval information pieces and requesting the decided processing unit to evaluate the interval information pieces, generating an evaluation result on the route information pieces by combining evaluation results on each of the interval information pieces, the evaluation results being generated by the processing unit in accordance with a request; and controlling the display unit such that the display unit displays an evaluation result on each of the route information pieces, the evaluation result being generated by combining.

Effects of the Invention

With the route evaluation apparatus according to the present invention, route information pieces are acquired and evaluated from a plurality of external database devices. The route evaluation apparatus includes the route information acquisition unit, the route reproduction unit, the evaluation criterion storage unit, the route evaluation unit, and the display control unit. The route information acquisition unit acquires the route information pieces from each of the external database devices. The route reproduction unit then reproduces the route information pieces in the format used inside the route evaluation apparatus. The route evaluation unit evaluates the plurality of route information pieces generated by reproduction by the route reproduction unit on the basis of the evaluation criteria stored in the evaluation criterion storage unit. The display control unit controls the display unit such that the display unit displays the evaluation result on each of the route information pieces, the evaluation result being generated by evaluation by the route evaluation unit. Each of the route information pieces includes the waypoint information pieces. The route evaluation unit generates an evaluation result by calculating a time and a distance concerning a route including the waypoint represented by the waypoint information piece on the basis of evaluation criteria.

Thus, the display control unit controls the display unit such that the display unit displays the evaluation results acquired by evaluating the plurality of route information pieces acquired from a plurality of external database devices on the basis of the same criteria. With this operation, the evaluation results acquired by evaluating a plurality of route information pieces on the basis of the same criteria are displayed on the display unit to allow the user to fairly compare and evaluate the plurality of route information pieces acquired from the plurality of external database devices. Thus, this can improve the reliability of the route evaluation apparatus.

With the route evaluation method according to the present invention, route information pieces are acquired and evaluated from a plurality of external database devices. The route information pieces are acquired from each of the external database devices and reproduced in the format used inside the route evaluation apparatus. The plurality of route information pieces generated by reproduction are evaluated by calculating times and distances concerning the routes including the waypoints represented by waypoint information pieces based on evaluation criteria. The display unit is then controlled to display the evaluation results.

In this manner, the display unit is controlled to display the evaluation result acquired by evaluating the plurality of route information pieces acquired from the plurality of external database devices on the basis of the same criteria. With this operation, the evaluation results acquired by evaluating the plurality of route information pieces on the basis of the same criteria are displayed on the display unit to allow the user to fairly compare and evaluate the plurality of route information pieces acquired by the plurality of external database devices. This can improve the reliability of the evaluation.

Objects, features, aspects, and advantages of the present invention will become more apparent from the following detailed description and the accompanying drawings.

BRIEF DESCRIPTION OF DRAWINGS

FIG. 1 is a block diagram showing the configuration of an information providing device 2 including a route evaluation apparatus 1 according to a first embodiment of the present invention.

FIG. 3 is a block diagram showing the hardware configurations of third-party Web server devices 6 and the route evaluation apparatus 10 that constitute the information providing system 100 shown in FIG. 2.

FIG. 4 is a diagram showing an example of an evaluation setting profile stored in an evaluation criterion storage unit 14 shown in FIG. 2.

FIG. 8 is a block diagram showing the configuration of an information providing system 100B including an information providing device 3B including a route evaluation apparatus 10A according to a fourth embodiment of the present invention.

FIG. 9 is a flowchart showing a processing procedure concerning route reproduction request processing in the route evaluation apparatus 10A according to the fourth embodiment of the present invention.

FIG. 13 is a diagram showing route information pieces generated by a route reproduction unit 12 by reproducing third-party route information pieces in its internal format.

FIG. 14 is a diagram showing an evaluation result on a route information piece A1 generated by an evaluation result combining unit 53.

FIG. 15 is a diagram showing a transport means division table stored in a route information dividing unit 51.

FIG. 16 is a diagram showing interval information pieces generated by the route information dividing unit 51 by dividing the route information pieces shown in FIG. 13 on the basis of the transport means division table shown in FIG. 15.

FIG. 17 is a diagram showing the interval information pieces generated by the route information dividing unit 51 by dividing the route information pieces shown in FIG. 13 on the basis of the transport means division table shown in FIG. 15.

FIG. 18 is a diagram showing the interval information pieces generated by the route information dividing unit 51 by dividing the route information pieces shown in FIG. 13 on the basis of the transport means division table shown in FIG. 15.

FIG. 19 is a diagram showing the interval information pieces generated by the route information dividing unit 51 by dividing the route information pieces shown in FIG. 13 on the basis of the transport means division table shown in FIG. 15.

FIG. 20 is a diagram showing a route evaluation request table stored in a route evaluation request unit 52.

FIG. 21 is a diagram showing a route evaluation request table stored in the route evaluation request unit 52.

FIG. 22 is a diagram showing an evaluation result on the interval information pieces generated by the route evaluation request unit 52.

FIG. 23 is a diagram showing an evaluation result on the interval information pieces generated by the route evaluation request unit 52.

FIG. 24 is a diagram showing an evaluation result on the interval information pieces generated by the route evaluation request unit 52.

FIG. 25 is a diagram showing an evaluation result on the interval information pieces generated by the route evaluation request unit 52.

DESCRIPTION OF EMBODIMENTS

First Embodiment

Figure 2:
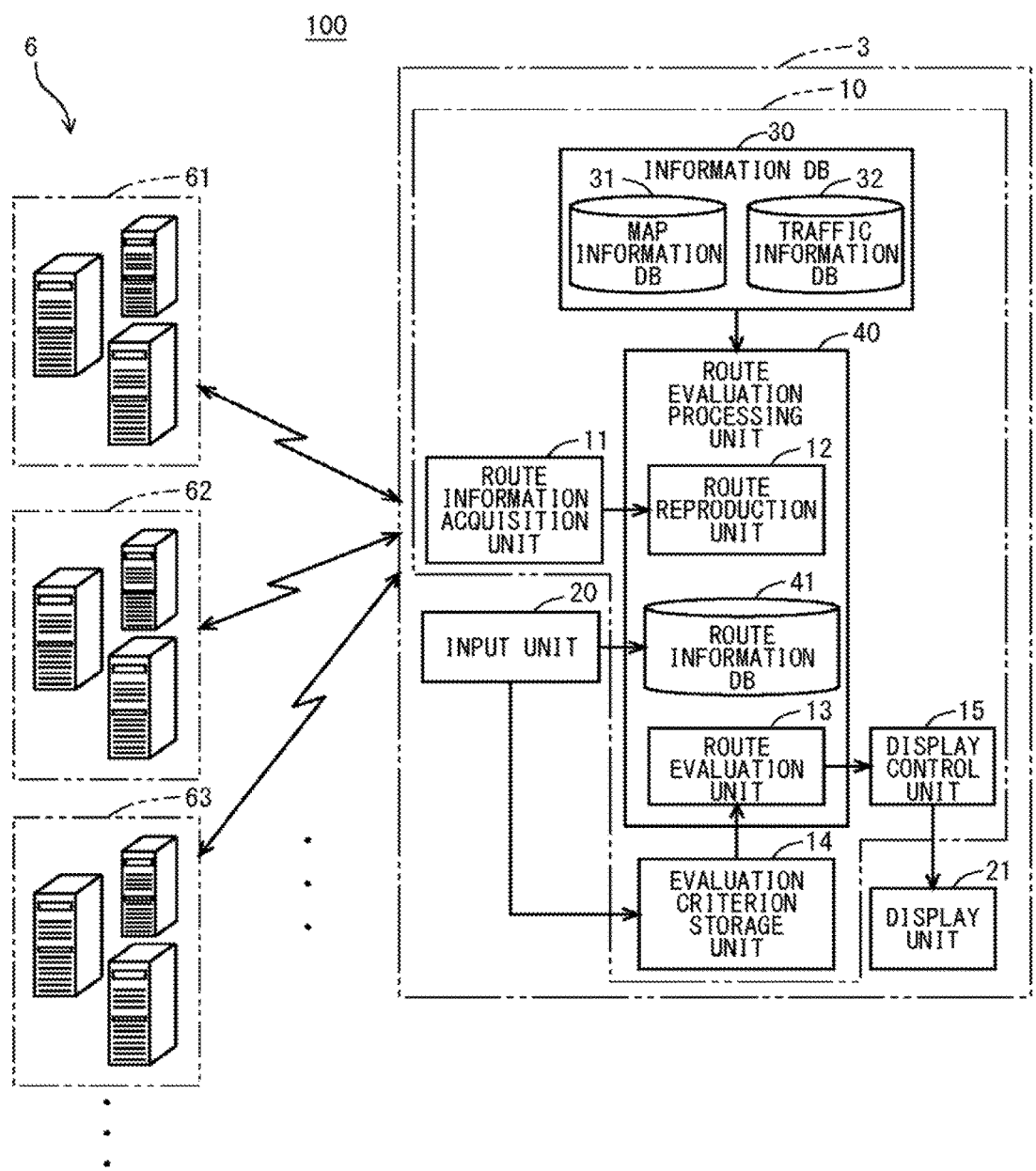
FIG. 2 is a block diagram showing the configuration of an information providing system 100 including an information providing device 3 including a route evaluation apparatus 10 according to a second embodiment of the present invention.

FIG. 1 is a block diagram showing the configuration of an information providing device 2 including a route evaluation apparatus 1 according to a first embodiment of the present invention. The route evaluation apparatus 1 according to this embodiment and the information providing device 2 including the route evaluation apparatus 1 are configured to be movable together with a movable body such as a vehicle. In the embodiment, the information providing device 2 is implemented by a navigation device having a navigation function of guiding routes. The route evaluation apparatus 1 according to the embodiment executes a route evaluation method according to another embodiment of the present invention.

The information providing device 2 includes the route evaluation apparatus 1 and a display unit 21. The route evaluation apparatus 1 includes a route information acquisition unit 11, a route reproduction unit 12, a route evaluation unit 13, an evaluation criterion storage unit 14, and a display control unit 15.

A plurality of third-party Web server devices (not shown) are provided outside the information providing device 2. The route information acquisition unit 11 acquires route information pieces concerning routes from each of the third-party Web server devices. The route information acquisition unit 11 supplies a plurality of acquired route information pieces to the route reproduction unit 12.

The route reproduction unit 12 reproduces each of the route information pieces acquired by the route information acquisition unit 11 in the format used inside the route evaluation apparatus 1 as an own apparatus. The route reproduction unit 12 supplies a plurality of reproduced route information pieces to the route evaluation unit 13.

The evaluation criterion storage unit 14 stores predetermined evaluation criteria. In this case, "evaluation criteria" are criteria for evaluating the plurality of route information pieces generated by reproduction by the route reproduction unit 12.

The route evaluation unit 13 evaluates the route information pieces on the basis of evaluation criteria stored in the evaluation criterion storage unit 14. The route evaluation unit 13 supplies evaluation results to the display control unit 15.

The display control unit 15 controls the display unit 21 such that the display unit 21 displays the evaluation result on each of the route information pieces, the evaluation result being generated by evaluation by the route evaluation unit 13. More specifically, the display control unit 15 supplies the evaluation results supplied from the route evaluation unit 13 to the display unit 21 for displaying the evaluation results. The display unit 21 displays the evaluation results supplied from the display control unit 15.

As described above, according to this embodiment, the route information pieces are acquired from the plurality of third-party Web server devices and provided to a user. The route evaluation apparatus 1 includes the route information acquisition unit 11, the route reproduction unit 12, the route evaluation unit 13, the evaluation criterion storage unit 14, and the display control unit 15. The route information acquisition unit 11 acquires the route information pieces from each of the third-party Web server devices. The route reproduction unit 12 reproduces the route information pieces acquired by the route information acquisition unit 11 in the format used inside the route evaluation apparatus 1. The route evaluation unit 13 evaluates the plurality of route information pieces generated by reproduction by the route reproduction unit 12 on the basis of evaluation criteria stored in the evaluation criterion storage unit 14. The display control unit 15 controls the display unit 21 such that the display unit 21 displays the evaluation results obtained by the route evaluation unit 13.

In this manner, the display control unit 15 controls the display unit 21 such that the display unit 21 displays the evaluation results obtained by evaluating the plurality of route information pieces acquired from a plurality of third-party Web server devices on the basis of the same criteria. This causes the display unit 21 to display the evaluation results obtained by evaluating a plurality of route information pieces on the basis of the same criteria, and hence allows the user to fairly compare and evaluate the plurality of route information pieces acquired from the plurality of third-party Web server devices. Thus, this makes it possible to improve the reliability of the route evaluation apparatus 1.

Second Embodiment

FIG. 2 is a block diagram showing the configuration of an information providing system 100 including an information providing device 3 including a route evaluation apparatus 10 according to a second embodiment of the present invention. The route evaluation apparatus 10 and the information providing device 3 according to this embodiment are similar in configuration to the route evaluation apparatus 1 and the information providing device 2 according to the first embodiment described above. Thus, the same reference numerals denote the same constituent elements, and a repetitive description will be omitted.

The information providing system 100 includes a plurality of third-party Web server devices 61, 62, 63, . . . and the information providing device 3. In the following description, the plurality of third-party Web server devices 61, 62, 63, . . . are sometimes generically referred to as "third-party Web server devices 6".

The third-party Web server devices 6 and the route evaluation apparatus 10 are configured to be communicatively connected to each other. The route evaluation apparatus 10 and the information providing device 3 including the route evaluation apparatus 10 are configured to be mountable on a movable body such as a vehicle. In this embodiment, the information displaying device 3 is implemented by a navigation device having a navigation function of guiding routes. The route evaluation apparatus 10 according to the embodiment executes a route evaluation method according to another embodiment of the present invention.

The third-party Web server device 6 is a server device on the Internet. The third-party Web server device 6 generates a route information piece by performing a route search in accordance with a request from the information providing device 3. In the following description, the route information piece generated by the third-party Web server device 6 is sometimes referred to as a "third-party route information piece".

The plurality of third-party Web server devices 6 generate third-party route information pieces in different data formats by using search algorithms on the basis of information pieces such as map information pieces and traffic information pieces held in each of the third-party Web server devices 6. Thus, the third-party route information pieces generated by each of the third-party Web server devices 6 are route information pieces generated according to different criteria, by different methods, and in different formats. The third-party Web server devices 6 transmit the generated third-party route information pieces to the information providing device 3.

The information providing device 3 includes the route evaluation apparatus 10, an input unit 20, and a display unit 21. The route evaluation apparatus 10 includes a route information acquisition unit 11, an evaluation criterion storage unit 14, a display control unit 15, an information database (abbreviated as: DB) 30, and a route evaluation processing unit 40. The information DB 30 includes a map information DB 31 and a traffic information DB 32. The route evaluation processing unit 40 includes a route reproduction unit 12, a route evaluation unit 13, and a route information DB 41.

The route information acquisition unit 11 acquires the third-party route information pieces generated by the plurality of third-party Web server devices 6 by receiving them via the Internet. The route information acquisition unit 11 supplies the acquired third-party route information pieces to the route evaluation processing unit 40, more specifically the route reproduction unit 12.

The third-party route information pieces include information pieces representing a departure place, destination, course, and evaluation values. An information piece representing a course included in the third-party route information pieces is represented by, for example, a latitude/longitude coordinate point sequence and a road link sequence of a map information piece. Information pieces representing evaluation values included in the third-party route information pieces include, for example, information pieces representing a travel distance, travel time, and fuel consumption concerning the route information pieces.

The map information DB 31 stores the map information piece used by the route reproduction unit 12 and the route evaluation unit 13 of the route evaluation processing unit 40. The map information pieces are stored for each road link. The map information pieces include road shape data, road network data, and road attribute data. The road shape data is data representing the shapes of roads with latitudes and longitudes. The road network data is data representing linkages between roads. The road attribute data is data representing road attributes such as road types, lane counts, and speed limits.

The traffic information DB 32 stores traffic information pieces for each road link in the map information DB 31. The traffic information pieces include traffic jam information pieces concerning traffic jam states, traffic restriction information pieces concerning traffic restrictions, and construction information pieces concerning constructions.

In this embodiment, the information DB 30 includes the map information DB 31 and the traffic information DB 32. In another embodiment of the present invention, the information DB 30 may include only the map information DB 31.

The evaluation criterion storage unit 14 stores, as an evaluation setting profile, the evaluation criteria used for evaluation in the route evaluation unit 13 of the route evaluation processing unit 40, more specifically evaluation setting values. The evaluation setting profiles will be described in detail later. The route evaluation processing unit 40 evaluates the plurality of third-party route information pieces supplied from the route information acquisition unit 11.

The route reproduction unit 12 reproduces each of the route information pieces acquired by the route information acquisition unit 11 in the format used inside the route evaluation apparatus 10 as an own apparatus. More specifically, the route reproduction unit 12 reproduces a course included in the third-party route information pieces in the form of a road link sequence in the map information DB 31. The route reproduction unit 12 generates a route information piece having a reproduced course. The route reproduction unit 12 stores, in the route information DB 41, the third-party route information piece supplied from the route information acquisition unit 11 in association with the generated route information piece. In the following description, the route information piece having the course reproduced by the route reproduction unit 12 is sometimes referred to as a "reproduced route information piece". The route information DB 41 stores a plurality of reproduced route information pieces for each departure place and each destination.

The route evaluation unit 13 evaluates predetermined items concerning a plurality of reproduced route information pieces stored in the route information DB 41 by using information pieces stored in the information DB 30 and evaluation setting values set by an evaluation setting profile stored in the evaluation criterion storage unit 14.

The route evaluation unit 13 includes, in the reproduced route information pieces, evaluation results on a plurality of reproduced route information pieces, more specifically the values (to be sometimes referred to as "evaluation values" hereinafter) obtained by evaluating the plurality of reproduced route information pieces, thereby generating reproduced route information pieces including the evaluation values. The route evaluation unit 13 supplies the plurality of generated reproduced route information pieces to the display control unit 15. The items to be evaluated by the route evaluation unit 13 include, for example, the distance from a departure place to a destination, a required time, fuel consumption, and the numbers of right and left turns.

The display control unit 15 supplies the evaluation values included in the plurality of reproduced route information pieces supplied from the route evaluation processing unit 40 to the display unit 21. The display unit 21 displays the evaluation values supplied from the display control unit 15 on a display window, thereby presenting the evaluation values to the user. The user can select one of the reproduced route information pieces by comparing the plurality of evaluation values displayed on the display unit 21. With this operation, the route to be used by the user is decided and used for route guidance or the like. The display unit 21 is implemented by a display device such as a liquid crystal display.

The input unit 20 is implemented by, for example, a touch panel and a keyboard. The user can input a destination and route search conditions by using the input unit 20. The user can also change an evaluation setting profile and the contents of the evaluation setting profile stored in the evaluation criterion storage unit 14 by using the input unit 20.

FIG. 3 is a block diagram showing the hardware configurations of the third-party Web server devices 6 and the route evaluation apparatus 10 that constitute the information providing system 100 shown in FIG. 2. FIG. 3 shows the hardware configuration of the first third-party Web server device 61 as a representative of the plurality of third-party Web server devices 61, 62, 63, . . . . The hardware configuration of each of the remaining third-party Web server devices 62, 63, . . . is the same as that of the first third-party Web server device 61, and hence a repetitive description will be omitted. In the following description, the "first third-party Web server device 61" is sometimes referred to as the "third-party Web server device 6".

The information providing system 100 includes the third-party Web server devices 6, the information providing device 3 including the route evaluation apparatus 10, and a network 8.

The third-party Web server device 6 includes a hard disk drive (abbreviated as: HDD) device 611, a processing circuit 612, a memory 613, and a communication interface (abbreviated as: I/F) 614.

The HDD device 611 is an external storage device that stores various types of information pieces in the third-party Web server device 6.

The processing circuit 612 executes programs stored in the memory 613. The processing circuit 612 is implemented by, for example, a processor (also called a Central Processing Unit, processing device, arithmetic device, microprocessor, microcomputer, or Digital Signal Processor).

The memory 613 stores various types of information pieces in the third-party Web server device 6 and programs executed by the processing circuit 612. The memory 613 also forms a work area for the processing circuit 612.

The memory 613 is implemented by, for example, nonvolatile or volatile semiconductor memory such as a RAM (Random Access Memory), ROM (Read Only Memory), flash memory, EPROM (Erasable Programmable Read Only Memory), or EEPROM (Electrically Erasable Programmable Read Only Memory), a magnetic disc, a flexible disc, an optical disc, a compact disc, a minidisc, or a DVD (Digital Versatile Disc).

The communication I/F 614 is an interface through which the third-party Web server device 6 performs communication control for connection to the network 8. A communication device that communicates with the route evaluation apparatus 10 shown in FIG. 2 is connected to the communication I/F 614.

The route evaluation apparatus 10 includes an input I/F 71, an output I/F 72, an HDD device 73, a communication I/F 74, a processing circuit 75, a memory 76, and a sensor 77.

Devices constituting the input unit 20 shown in FIG. 2 described above, for example, the touch panel and the key board, are connected to the input I/F 71.

Devices constituting the output unit are connected to the output I/F 72. The devices constituting the output unit include, for example, a loudspeaker and a device forming the display unit 21 shown in FIG. 2 described above, more specifically a display.

The HDD device 73 is a storage device that stores various types of information pieces in the route evaluation apparatus 10. The map information DB 31, the traffic information DB 32, the route information DB 41, and the evaluation criterion storage unit 14 shown in FIG. 2 are implemented by the HDD device 73. The HDD device 73 stores programs respectively corresponding to the route information acquisition unit 11, the route reproduction unit 12, and the route evaluation unit 13 shown in FIG. 2.

The communication I/F 74 is an interface through which the route evaluation apparatus 10 performs communication control for connection to the network 8. A communication device that communicates with the third-party Web server device 6 shown in FIG. 2 is connected to the communication I/F 74. Using the communication I/F 74 and the communication device connected to the communication I/F 74 allows the route information acquisition unit 11 shown in FIG. 2 to acquire third-party route information pieces.

FIG. 3 shows the configuration in which the hardware of the devices respectively connected to the input I/F 71, the output I/F 72, and the communication I/F 74 is provided in the route evaluation apparatus 10. However, these device may be externally connected to the route evaluation apparatus 10.

The processing circuit 75 is formed from, for example, a CPU (also called a Central Processing Unit, central processor, processing device, arithmetic device, microprocessor, microcomputer, processor, or DSP).

The processing circuit 75 implements the functions of the route information acquisition unit 11, the route reproduction unit 12, and the route evaluation unit 13 in the route evaluation apparatus 10. That is, the route evaluation apparatus 10 includes the processing circuit 75 that acquires route information pieces from the third-party Web server devices 6, reproduces the acquired route information pieces in the format used inside an own apparatus, evaluates the reproduced route information pieces on the basis of evaluation criteria, and outputs the evaluation results.

The memory 76 reads out and stores various types of information pieces and programs stored in the HDD device 73. In addition, the memory 76 forms a work area for the processing circuit 75.

The memory 76 is implemented by, for example, a non-volatile or volatile semiconductor memory such as a RAM, ROM, flash memory, EPROM, or EEPROM, a magnetic disc, a flexible disc, an optical disc, a compact disc, a minidisc, or a DVD.

The functions of the route information acquisition unit 11, the route reproduction unit 12, and the route evaluation unit 13 each are implemented by software, firmware, or a combination of software and firmware. Software and firmware are described as programs and stored in the HDD device 73 and the memory 76.

The processing circuit 75 implements the functions of the route information acquisition unit 11, the route reproduction unit 12, and the route evaluation unit 13 by reading out and executing programs stored in the memory 76. That is, the route evaluation apparatus 10 includes the HDD device 73 and the memory 76 for storing programs working for the eventual execution of the step of acquiring route information pieces from the third-party Web server devices 6, the step of reproducing the acquired route information pieces in the format used inside an own apparatus, the step of evaluating the reproduced route information pieces on the basis of evaluation criteria, and the step of outputting the evaluation results.

These programs can also be regarded as programs for causing a computer to execute the processing procedures and methods performed by the route information acquisition unit 11, the route reproduction unit 12, and the route evaluation unit 13.

The sensor 77 detects a current position information piece representing the current position of the vehicle equipped with the route evaluation apparatus 10, the state of the vehicle, and the like. The sensor 77 is implemented by, for example, a global positioning system (abbreviated as: GPS) signal receiver for acquiring a position information piece such as the current position information piece.

The network 8 is a communication network for mutually connecting each of the third-party Web server devices 61, 62, 63, . . . to the route evaluation apparatus 10. The network 8 is, for example, the Internet.

FIG. 4 is a diagram showing an example of an evaluation setting profile stored in the evaluation criterion storage unit 14 shown in FIG. 2. The evaluation criterion storage unit 14 stores evaluation setting values serving as evaluation criteria as described above in the form of an evaluation setting profile. An evaluation setting profile includes a plurality of evaluation setting values. An evaluation setting value represents a value that the route evaluation unit 13 can consider when performing evaluation. For example, as shown in FIG. 4, evaluation setting values include a vehicle velocity (Velocity), fuel consumption (Consumption), vehicle weight (Weight), user's vehicle driving skill (SkillLevel), consideration/non-consideration of traffic information pieces (TrafficInfo), consideration/non-consideration of traffic signals (TrafficSignal), and consideration/non-consideration of slopes (SlopeWay). The user can change evaluation setting values included in the evaluation setting profile and a profile to be used by using the input unit 20.

Figure 5:
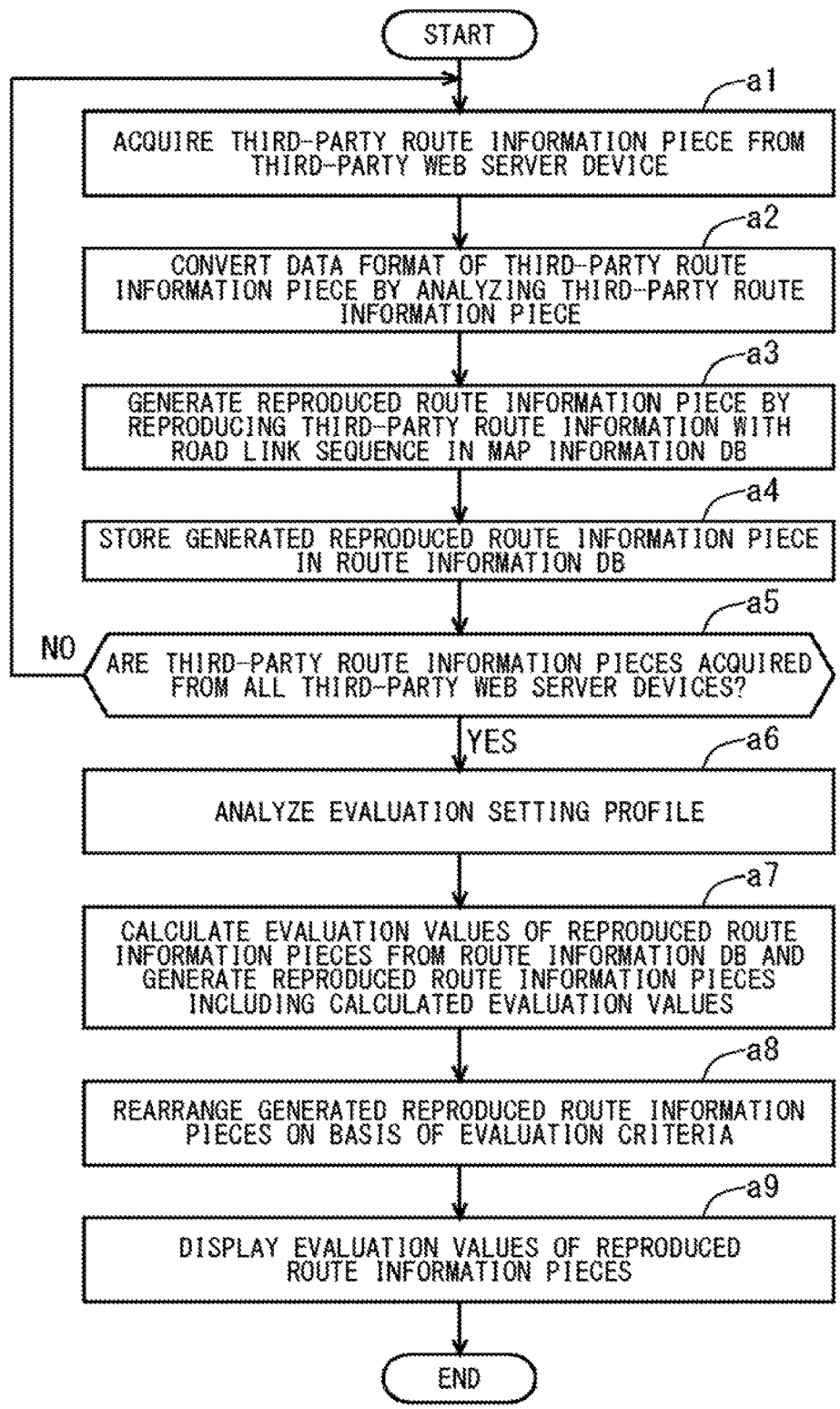
FIG. 5 is a flowchart showing a processing procedure concerning route information providing processing in the route evaluation apparatus 10 according to the second embodiment of the present invention.

FIG. 5 is a flowchart showing a processing procedure concerning route information providing processing in the route evaluation apparatus 10 according to the second embodiment of the present invention. The route information acquisition unit 11, the route evaluation processing unit 40, and the display control unit 15 that constitute the route evaluation apparatus 10 execute processes in the flowchart shown in FIG. 5. The processing in the flowchart shown in FIG. 5 starts when the input unit 20 inputs an instruction to display third-party route information pieces to the route evaluation apparatus 10 or a predetermined cycle starts. The process then shifts to step a1.

In step a1, the route information acquisition unit 11 acquires third-party route information pieces from the third-party Web server devices 6 via the network 8. When the process in step a1 finishes, the process shifts to step a2.

In step a2, the route information acquisition unit 11 analyzes the third-party route information pieces acquired in step a1, and converts the data format of the third-party route information pieces. More specifically, the route information acquisition unit 11 converts the data format concerning a course in the third-party route information pieces into a common format capable of inputting the information pieces to the route reproduction unit 12. When the process in step a2 finishes, the process shifts to step a3.

In step a3, the route reproduction unit 12 generates reproduced route information pieces by reproducing the third-party route information pieces, whose data format has been converted in step a2, into a road link sequence in the map information DB 31. In reproducing third-party route information pieces, when the course in the third-party route information pieces is expressed by a latitude/longitude coordinate point sequence, a road link sequence is generated and reproduced from the coordinate point sequence by performing the map matching processing of matching the coordinate points with the road links in the map information DB 31. In contrast, when the course in the third-party route information pieces is expressed by the road link sequence represented by the map information pieces different from those in the map information DB 31, reproduction is performed by performing road link conversion processing using a road link conversion table.

The above map matching processing is, for example, the processing of converting the course in third-party route information pieces which is represented by a latitude/longitude coordinate system into the course in reproduced route information pieces which is represented by road links in the map information DB 31. Map matching processing can be performed by, for example, acquiring road links close coordinate points representing a course in third-party route information pieces from the map information DB 31 and coupling the acquired road links to each other. Applying this processing to a coordinate point sequence representing a course in third-party route information pieces will generate a road link sequence in the map information DB 31 which represents a course in reproduced route information pieces.

The above road link conversion processing is the processing of converting the course in third-party route information pieces which is represented by road links in map information pieces stored in the third-party Web server device 6 into the course in reproduced route information pieces which is represented by road links in the map information DB 31. The road link conversion table used for road link conversion processing is a table that can uniquely convert road links in map information pieces stored in the third-party Web server device 6 into road links in map information pieces stored in the map information DB 31. The road link conversion table is, for example, a correspondence table having identifiers uniquely assigned to each of the road links in respective map information pieces.

In road link conversion processing, the road link conversion table is searched for each road link in third-party route information pieces. If a corresponding road link is found in the map information DB 31 by the road link search, the road link in the third-party route information pieces is converted into a corresponding road link in the map information DB 31. If no corresponding road link is found in the map information DB 31 by the road link search, a course is generated by coupling preceding and succeeding road links in the map information DB 31 with a shortest link. Applying this processing to a road link sequence representing a course in the third-party route information pieces will generate a road link sequence in the map information DB 31 which represents a course in reproduced route information pieces. When the process in step a3 finishes, the process shifts to step a4.

In step a4, the route reproduction unit 12 stores the generated reproduced route information pieces in the route information DB 41. When the process in step a4 finishes, the process shifts to step a5.

In step a5, the route information acquisition unit 11 determines whether it has acquired third-party route information pieces from all the third-party Web server devices 6. If the route information acquisition unit 11 determines that it has acquired third-party route information pieces from all the third-party Web server devices 6, the process shifts to step a6. If the route information acquisition unit 11 determines that it has not acquired third-party route information pieces from all the third-party Web server devices 6, the process returns to step a1.

In step a6, the route evaluation unit 13 reads out an evaluation setting profile from the evaluation criterion storage unit 14, and analyzes the readout evaluation setting profile. When the process in step a6 finishes, the process shifts to step a7.

In step a7, the route evaluation unit 13 calculates evaluation values concerning reproduced route information pieces in the route information DB 41 and generates reproduced route information pieces including the calculated evaluation values. More specifically, the route evaluation unit 13 calculates evaluation values concerning predetermined evaluation items with respect to a plurality of reproduced route information pieces having the same departure place and the same destination stored in the route information DB 41 by using a predetermined method on the basis of the evaluation setting values of the analyzed evaluation setting profile and the information pieces stored in the information DB 30. The route evaluation unit 13 includes the calculated evaluation values in the original reproduced route information pieces to generate reproduced route information pieces including the calculated evaluation values. When the process in step a7 finishes, the process shifts to step a8.

In step a8, the route evaluation unit 13 rearranges the reproduced route information pieces generated in step a7 on the basis of evaluation criteria. When the process in step a8 finishes, the process shifts to step a9.

In step a9, by control of the display control unit 15, the display unit 21 displays the evaluation results obtained by the route evaluation unit 13, more specifically the evaluation values concerning the reproduced route information pieces. This makes it possible to present the evaluation values concerning the reproduced route information pieces to the user. When the process in step a9 finishes, the entire processing procedure in FIG. 5 finishes.

As described above, in this embodiment, the route information pieces are acquired from the plurality of third-party Web server devices 6 and provided to the user. The route evaluation apparatus 10 includes the route information acquisition unit 11, the route reproduction unit 12, the evaluation criterion storage unit 14, the route evaluation unit 13, and the display control unit 15. The route information acquisition unit 11 acquires the route information pieces from each of the third-party Web server devices 6. The route reproduction unit 12 reproduces the route information pieces in the format used inside the route evaluation apparatus 10. The route evaluation unit 13 evaluates the plurality of route information pieces generated by reproduction by the route reproduction unit 12 on the basis of evaluation criteria stored in the evaluation criterion storage unit 14. The display control unit 15 controls the display unit 21 such that the display unit 21 displays the evaluation results obtained by the route evaluation unit 13.

In this manner, the display control unit 15 controls the display unit 21 such that the display unit 21 displays the evaluation results obtained by evaluating the plurality of route information pieces acquired from the plurality of third-party Web server devices 6 on the basis of the same criteria. With this operation, the evaluation results obtained by evaluating the plurality of route information pieces on the basis of the same criteria are displayed on the display unit 21 to allow the user to fairly compare and evaluate the plurality of route information pieces acquired from the plurality of third-party Web server devices 6. This can improve the reliability of the route evaluation apparatus 10.

In addition, according to this embodiment, the route reproduction unit 12 reproduces the route information pieces by matching the course included in the route information pieces acquired from the third-party Web server devices 6 with the road link sequence included in map information pieces. This makes it possible to convert the expressions of the courses included in each of the route information pieces in different data formats which are acquired from the plurality of third-party Web server devices 6 into road link sequences in the map information pieces stored in the map information DB 31. Therefore, unified evaluation can be performed on the basis of unified evaluation criteria.

In addition, according to this embodiment, the route evaluation unit 13 obtains evaluation setting values by analyzing an evaluation setting profile, and evaluates each of the road link sequences included in the plurality of route information pieces generated by reproduction by the route reproduction unit 12 for each route information piece by using the evaluation setting values, thereby obtaining evaluation results on the plurality of route information pieces. This makes it possible to perform evaluation in consideration of, for example, evaluation setting values concerning user's vehicle driving skill, taste, vehicle properties, and the like. It is therefore possible to perform accurate prediction and fairly evaluate a plurality of route information pieces on the basis of the same criteria.

In addition, according to this embodiment, the information DB 30 used by the route reproduction unit 12 and the route evaluation unit 13 includes the map information DB 31 and the traffic information DB 32. The map information DB 31 stores map information pieces including road link sequences. The traffic information DB 32 stores traffic information pieces in association with the road links in map information pieces. This allows the route evaluation unit 13 to consider map information pieces and traffic information pieces. It is therefore possible to accurately evaluate route information pieces concerning various items such as distance, time, and fuel consumption.

According to this embodiment described above, the route information DB 41 stores only the reproduced route information pieces generated by the route reproduction unit 12 and the display unit 21 displays the stored information pieces. However, this is not exhaustive, and reproduced route information pieces and third-party route information pieces corresponding to it may be handled as one information piece. When reproduced route information pieces and third-party route information pieces corresponding to it are to be handled as one information piece, the route information DB 41 stores reproduced route information pieces and third-party route information pieces corresponding to it as one set of information, and the display unit 21 displays evaluation values concerning the reproduced route information pieces and evaluation values concerning the third-party route information pieces to present them to the user.

This configuration presents the user with not only evaluation values concerning reproduced route information pieces but also the evaluation values concerning the original third-party route information pieces. This allows the user to visually recognize the evaluation values obtained by the route evaluation apparatus 10 and the evaluation values obtained by the third-party Web server device 6. The user can therefore check the recognition of the degrees of dissociation between the evaluation values, and hence the number of option increases. This can improve the convenience of the user.

Third Embodiment

Figure 6:
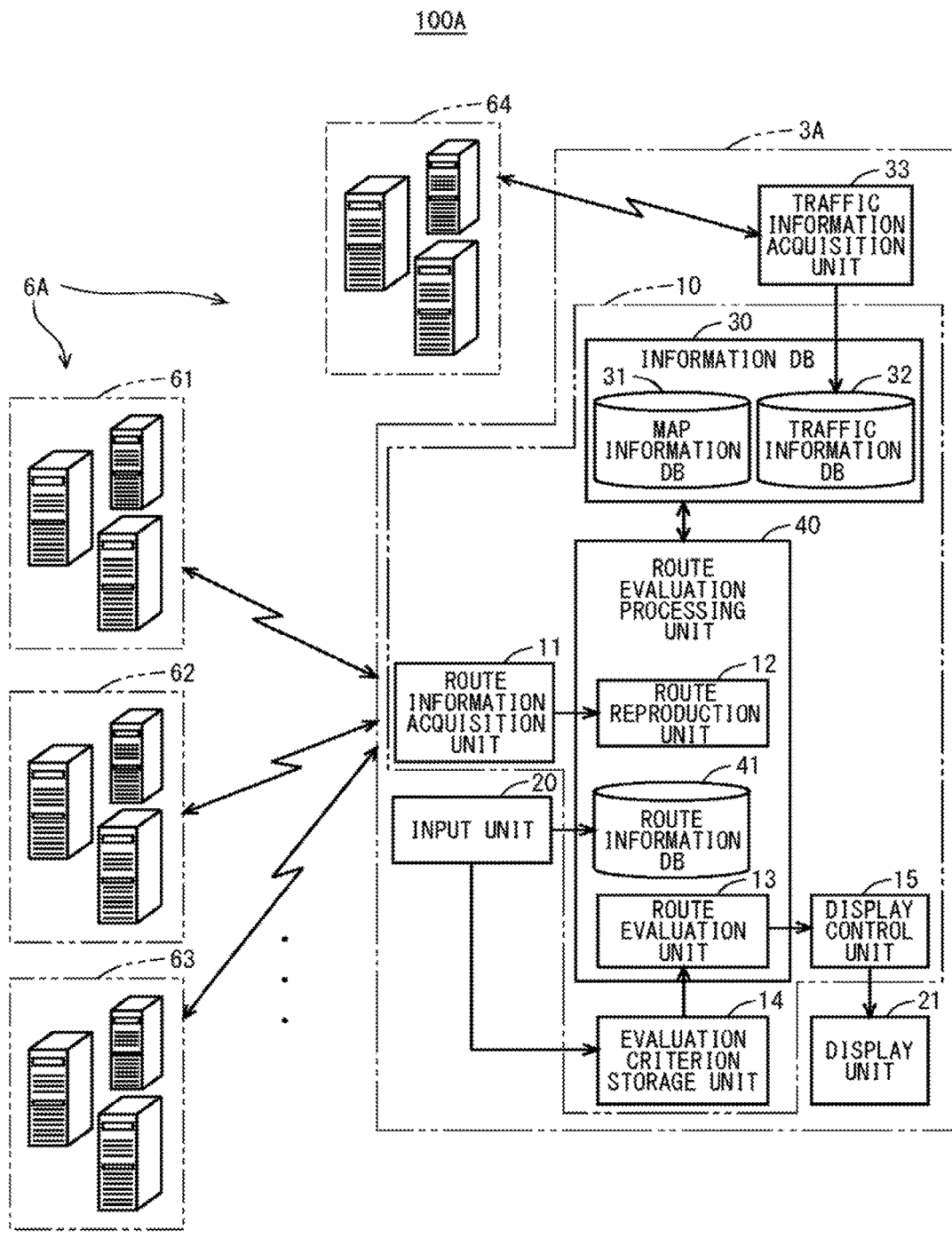
FIG. 6 is a block diagram showing the configuration of an information providing system 100A including an information providing device 3A including a route evaluation apparatus 10 according to a third embodiment of the present invention.

FIG. 6 is a block diagram showing the configuration of an information providing system 100A including an information providing device 3A including a route evaluation apparatus 10 according to the third embodiment of the present invention. The information providing system 100A includes a plurality of third-party Web server devices 61, 62, 63, 64, . . . and the information providing device 3A. In the following description, the plurality of third-party Web server devices 61, 62, 63, 64, . . . are sometimes generically referred to as "third-party Web server devices 6A". The constituent elements of the information providing system 100A according to this embodiment are similar to those of the route evaluation apparatus 1 according to the first embodiment. Accordingly, the same reference numerals denote the same constituent elements, and a repetitive description will be omitted.

The information providing system 100A according to this embodiment includes the third-party Web server device (to be sometimes referred to as the "traffic information server device" hereinafter) 64 that provides traffic information pieces, as the third-party Web server device 6A. The information providing device 3A also includes a traffic information acquisition unit 33 that acquires traffic information pieces from the traffic information server device 64.

The traffic information server device 64 is a server device that provides traffic information pieces to the traffic information acquisition unit 33. The traffic information acquisition unit 33 acquires the traffic information pieces delivered by the traffic information server device 64. The traffic information pieces are then stored in the traffic information DB 32 of the information DB 30 and are used by the route evaluation unit 13 for route evaluation. The information providing system 100A may include a plurality of traffic information server devices 64. In addition, the traffic information server devices 64 may be implemented by the third-party Web server devices 61, 62, 63, . . . that generate route information pieces.

The traffic information acquisition unit 33 is a processing unit that requests traffic information pieces of the traffic information server device 64 in accordance with a request for traffic information pieces from the route evaluation processing unit 40 and causes the traffic information DB 32 to store the traffic information pieces acquired from the traffic information server device 64. The traffic information pieces stored in the traffic information DB 32 are used for route evaluation by the route evaluation unit 13.

Figure 7:
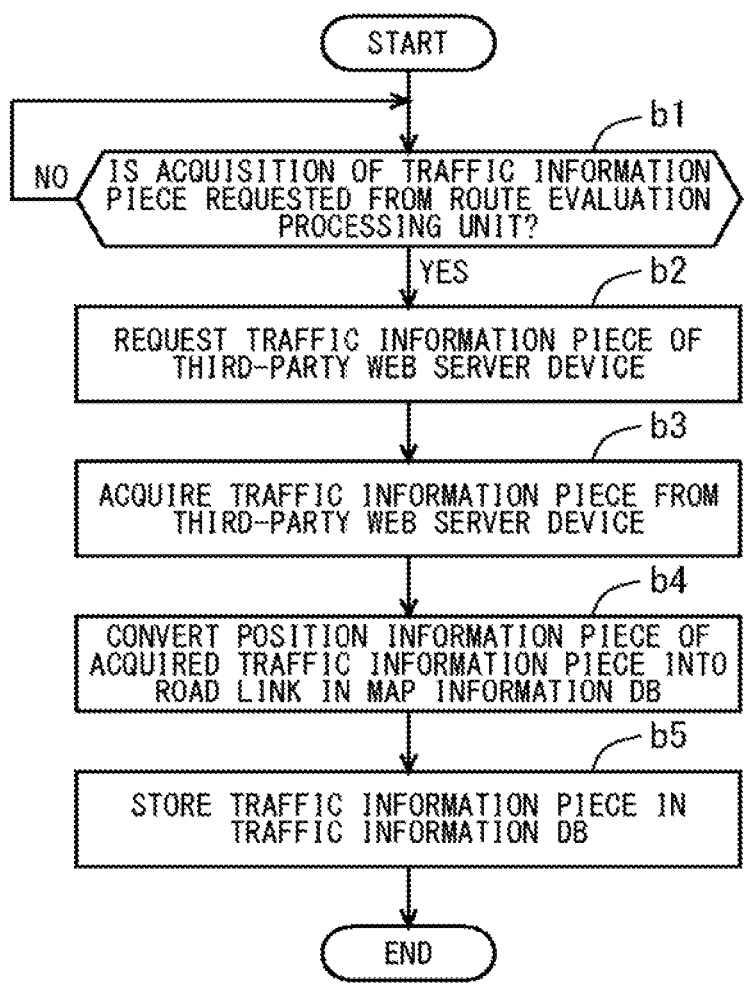
FIG. 7 is a flowchart showing a processing procedure concerning traffic information acquisition processing in the information providing device 3A according to the third embodiment of the present invention.

FIG. 7 is a flowchart showing a processing procedure concerning traffic information acquisition processing in the information providing device 3A according to the third embodiment of the present invention. The traffic information acquisition unit 33 constituting the information providing device 3A executes processes in the flowchart shown in FIG. 7. The processing in the flowchart shown in FIG. 7 starts when the information providing device 3A is powered on or a predetermined cycle starts. The process then shifts to step b1.

In step b1, the traffic information acquisition unit 33 determines whether it has received a request to acquire traffic information pieces from the route evaluation processing unit 40. The route evaluation processing unit 40 requests traffic information pieces of the traffic information acquisition unit 33 on the basis of the position information pieces included in route information pieces. The route evaluation processing unit 40 may issue a request to acquire traffic information pieces at the timing when the route reproduction unit 12 reproduces a route or at the timing when the route evaluation unit 13 evaluates a route.

If the traffic information acquisition unit 33 determines in step b1 that it has received a request to acquire traffic information pieces from the route evaluation processing unit 40, the process shifts to step b2. If the traffic information acquisition unit 33 determines that it has not received any request to acquire traffic information pieces from the route evaluation processing unit 40, the traffic information acquisition unit 33 stands by until it receives a request to acquire traffic information pieces from the route evaluation processing unit 40.

In step b2, the traffic information acquisition unit 33 requests traffic information pieces of the third-party Web server device 6A, more specifically the traffic information server device 64, in accordance with the acquisition request from the route evaluation processing unit 40. When the process in step b2 finishes, the process shifts to step b3.

In step b3, the traffic information acquisition unit 33 acquires traffic information pieces from the third-party Web server device 6A, more specifically the traffic information server device 64. When the process in step b3 finishes, the process shifts to step b4.

In step b4, the traffic information acquisition unit 33 converts the position information pieces included in the acquired traffic information pieces into a road link in a map information DB 31. When the process in step b4 finishes, the process shifts to step b5.

In step b5, the traffic information acquisition unit 33 stores the traffic information pieces in the traffic information DB 32. The route evaluation unit 13 uses the traffic information pieces stored in the traffic information DB 32 when evaluating the route. When the process in step b5 finishes, the entire processing procedure in FIG. 7 finishes.

As described above, according to this embodiment, the information providing device 3A includes the traffic information acquisition unit 33. This configuration allows the traffic information DB 32 in the route evaluation apparatus 10 to store the traffic information pieces delivered from the third-party Web server device 6A, mores specifically the traffic information server device 64. This makes it possible to evaluate the route information pieces in consideration of both the traffic information pieces delivered from the third-party Web server device 6A and the traffic information pieces held in the route evaluation apparatus 10. It is therefore possible to accurately evaluate the route information pieces.

Fourth Embodiment

FIG. 8 is a block diagram showing the configuration of an information providing system 100B including an information providing device 3B including a route evaluation apparatus 10A according to the fourth embodiment of the present invention. The information providing system 100B includes a plurality of third-party Web server devices 61, 62, 63, 65, . . . and an information providing device 3B. In the following description, the plurality of third-party Web server devices 61, 62, 63, 65, . . . are sometimes generically referred to as "third-party Web server devices 6B". The constituent elements of the information providing system 100B according to this embodiment are similar to those of the route evaluation apparatus 1 according to the first embodiment. Accordingly, the same reference numerals denote the same constituent elements, and a repetitive description will be omitted.

The information providing system 100B according to this embodiment is configured to cause the third-party Web server device 65 to perform route reproduction, which is performed by the route reproduction unit 12 in the first embodiment described above. In the following description, the third-party Web server device 65 that performs route reproduction is sometimes referred to as the "route reproduction server device 65".

The route evaluation apparatus 10A according to this embodiment is modified to include a route reproduction request unit 50 and the route reproduction server device 65 in place of the route reproduction unit 12 and the information DB 30 in the route evaluation apparatus 10 according to the first embodiment and to cause the route reproduction request unit 50 to read out the evaluation criteria stored in the evaluation criterion storage unit 14.

The route reproduction request unit 50 is a processing unit that requests the route reproduction server device 65 to search for a route by using the course in the third-party route information pieces acquired by the route information acquisition unit 11 and the evaluation criteria stored in the evaluation criterion storage unit 14, more specifically evaluation setting values, as search setting values. The route information DB 41 stores the third-party route information pieces requested by the route reproduction request unit 50 and acquired by the route information acquisition unit 11.

The route reproduction server device 65 is a server device that generates route information pieces by searching for a route in accordance with a route search request from the route reproduction request unit 50. The route reproduction server device 65 may be implemented by the third-party Web server devices 61, 62, 63, . . . that generate route information pieces.

FIG. 9 is a flowchart showing a processing procedure concerning route reproduction request processing in the route evaluation apparatus 10A according to the fourth embodiment of the present invention. The route reproduction request unit 50 constituting the route evaluation apparatus 10A executes processes in the flowchart shown in FIG. 9. The processing in the flowchart shown in FIG. 9 starts when the route reproduction request unit 50 requests the route reproduction server device 65 to reproduce a route and the route information acquisition unit 11 acquires third-party route information pieces. The process then shifts to step c1.

In step c1, the route reproduction request unit 50 determines whether the third-party route information pieces acquired by the route information acquisition unit 11 are the requested third-party route information pieces. If the route reproduction request unit 50 determines that the acquired information pieces are the requested third-party route information pieces, the process shifts to step c2. If the route reproduction request unit 50 determines that the acquired information pieces are not the requested third-party route information pieces, the process shifts to step c3.

In step c2, the route reproduction request unit 50 stores the acquired third-party route information pieces in the route information DB 41. When the process in step c2 finishes, the entire processing procedure in FIG. 8 finishes.

In step c3, the route reproduction request unit 50 analyzes an evaluation setting profile. When the process in step c3 finishes, the process shifts to step c4.

In step c4, the route reproduction request unit 50 requests the route reproduction server device 65 to reproduce a route. More specifically, the route reproduction request unit 50 generates search conditions from the evaluation setting profile and the third-party route information pieces, and requests the route reproduction server device 65 to reproduce a route. The search conditions include the vehicle velocity, fuel consumption, and the like included in an evaluation setting profile and the destination, relay point, departure place, and the like included in third-party route information pieces.

The route reproduction server device 65 generates third-party route information pieces according to search conditions. The route information acquisition unit 11 acquires the generated third-party route information pieces. When the process in step c4 finishes, the entire processing procedure in FIG. 9 finishes.

As described above, this embodiment is provided with the route reproduction request unit 50 in place of the route reproduction unit 12 according to the first embodiment. The route information acquisition unit 11 acquires the route information pieces reproduced by the route reproduction server device 65 in response to a request from the route reproduction request unit 50. With this operation, when the third-party route information pieces generated by another third-party Web server device 6B are to be evaluated by using the accurate traffic information pieces held in the route reproduction server device 65, the route reproduction server device 65 reproduces a route. This makes it possible to fairly evaluate route information pieces without acquiring any traffic information pieces from the route reproduction server device 65 having accurate traffic information pieces.

Fifth Embodiment

Figure 10:
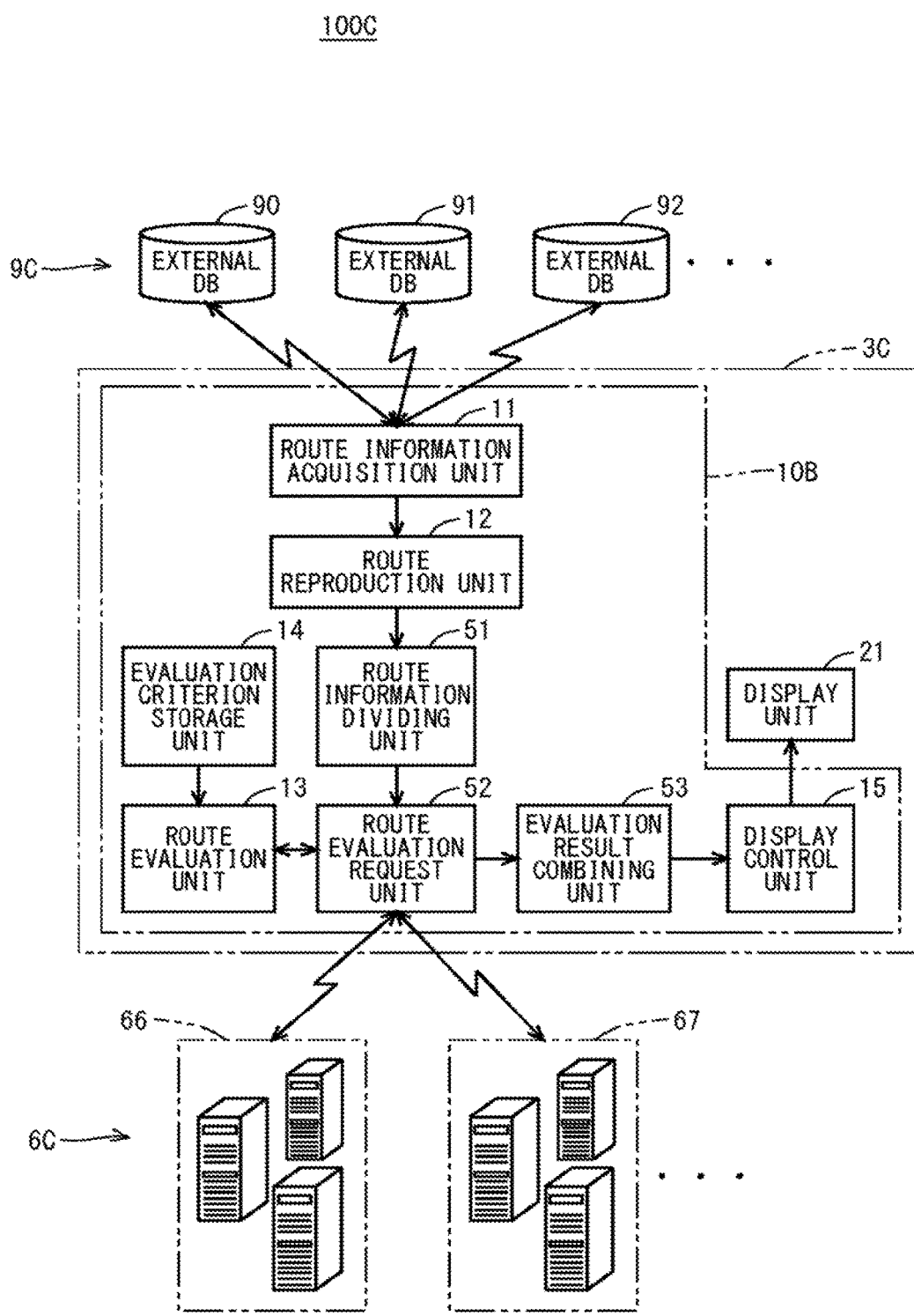
FIG. 10 is a block diagram showing the configuration of an information providing system 100C including an information providing device 3C including a route evaluation apparatus 10B according to a fifth embodiment of the present invention.

FIG. 10 is a block diagram showing the configuration of an information providing system 100C including an information providing device 3C including a route evaluation apparatus 10B according to the fifth embodiment of the present invention. The information providing system 100C includes a plurality of external databases (abbreviated as: external DB) devices 90, 91, 92, . . . , external information processing server devices 66, 67, . . . , and the information providing device 3C. The constituent elements of the information providing system 100C according to this embodiment are similar to those of the route evaluation apparatus 1 according to the first embodiment. Accordingly, the same reference numerals denote the same constituent elements, and a repetitive description will be omitted.

The information providing system 100C according to this embodiment is configured to replace the third-party Web server devices 60, 61, 62, . . . in the information providing system 100 according to the second embodiment with the external database devices 90, 91, 92, . . . and further include the information processing server devices 66, 67, . . . .

According to this embodiment, the route evaluation apparatus 10B is configured such that the own apparatus 10B and the external information processing server devices 66, 67, . . . perform evaluation processing for the route information pieces converted in the data format in the own apparatus 10B. More specifically, the route evaluation apparatus 10B divides route information pieces into a plurality of interval information pieces according to differences in transport means, and the own apparatus 10B and the external information processing server devices 66, 67, . . . evaluate the interval information pieces.

The external database devices 90, 91, 92, . . . are database devices on the Web which hold a plurality of route information pieces and provide them to the route evaluation apparatus 10B. In the following description, the external database devices 90, 91, 92, . . . are sometimes generically referred to as "external database devices 9C". The external database device 9C may be installed by the third party or the manufacturer of the route evaluation apparatus 10B.

The external information processing server devices 66, 67, . . . are server devices that execute route search services on the Web, which generate route information pieces using specific transport means upon the input of departure places and destinations. In the following description, the external information processing server devices 66, 67, . . . are sometimes generically referred to as "external information processing server device 6C". The external information processing server device 6C may be installed by the manufacturer of the route evaluation apparatus 10B or a third party.

The route evaluation apparatus 10B includes a route information dividing unit 51, a route evaluation request unit 52, and an evaluation result combining unit 53 in addition to the components of the route evaluation apparatus 1 according to the first embodiment.

The route information dividing unit 51 divides the route information pieces generated by the route reproduction unit 12 into a plurality of interval information pieces according to differences in transport means.

The route evaluation request unit 52 requests the route evaluation unit 13 or the external information processing server device 6C to evaluate the interval information pieces included in the route information pieces in accordance with transport means, and generates an evaluation result on each of the interval information pieces. The route evaluation request unit 52 supplies the generated evaluation results on the interval information pieces to the route evaluation unit 13, the evaluation result combining unit 53, and the external information processing server device 6C.

The evaluation result combining unit 53 generates evaluation results on the route information pieces by combining the evaluation results on the interval information pieces supplied from the route evaluation request unit 52.

In this embodiment, transport means is concrete means of transportation used by the user for movement between two points. Transport means include, for example, walking, a private bicycle, a private vehicle, a rental car company, a taxi company, a bus company, a railroad company, an airline company, and a passenger transport company. Transport means that can provide transportation in the same manner, such as a rental car company and a taxi company, are sometimes simply noted as rental cars or taxies.

In addition, the route information pieces generated by the route reproduction unit 12 according to this embodiment include the departure place of a route, the destination of the route, and waypoint information pieces from the departure place to the destination. Waypoint information pieces include a waypoint of a route and transport means to reach the waypoint. The route information pieces include at least one or more waypoint information pieces.

The route information dividing unit 51 divides the route information pieces generated by the route reproduction unit 12 into one or more interval information pieces according to differences in transport means on the basis of a transport means division table for dividing route information pieces according to differences in transport means. The interval information pieces generated by the route information dividing unit 51 are information pieces including a departure, destination, and transport means or transport means classifications collectively including transport means.

A transport means division table is a table listing transport means classifications each constituted by at least one transport means. The route information dividing unit 51 uses this table for determining division groups according to which the route information dividing unit 51 divides route information pieces into interval information pieces.

When there are consecutive waypoint information pieces including different transport means belonging to the same transport means classification, the route information dividing unit 51 generates the plurality of waypoint information pieces as one interval information piece. A transport means division table is a table for gathering a plurality of transport means into one group, and need not contain all types of transport means. In addition, in practice, different types of transport means may be grouped into the same transport means classification.

The route evaluation request unit 52 requests the route evaluation unit 13 or the external information processing server device 6C to evaluate the interval information pieces generated by the route information dividing unit 51 for each transport means or transport means classification. The route evaluation request unit 52 also generates evaluation results on the interval information pieces used inside an own apparatus 10B, on the basis of the calculation results on the interval information pieces generated by the external information processing server device 6C.

The route evaluation request unit 52 issues an interval information evaluation request for each transport means or transport means classification on the basis of a route evaluation request table describing request destinations and request methods.

Evaluation processing for interval information pieces is the same as that for route information pieces in the first embodiment. More specifically, evaluation processing for interval information pieces is the processing of generating a route including a departure place, destination, and waypoint, and calculating evaluation values concerning the route such as a moving time, moving distance, and moving cost concerning the route. The route evaluation unit 13 and the external information processing server device 6C generate an evaluation result by integrating the evaluation values by executing evaluation processing for interval information pieces.

A route evaluation request table is a table listing request destination information pieces, which stores information pieces required to issue an interval information evaluation request, for each transport means or transport means classification. The request destination information pieces include transport means or a transport means classification, evaluation request information pieces for requesting the external information processing server device 6C to evaluate interval information pieces, and evaluation extraction information pieces for extracting information pieces from the evaluation results generated by the external information processing server device 6C.

The evaluation request information pieces include the service name of the external information processing server device 6C, the access destination of the external information processing server device 6C, and items required for access.

The evaluation extraction information pieces include items extracted from the route information pieces generated by the external information processing server device 6C and the transfer time required when transport means is changed.

The evaluation result combining unit 53 generates an evaluation result on one route information piece by combining the evaluation values concerning the evaluation results on the plurality of interval information pieces generated by the route evaluation request unit 52 according to the course.

Figure 11:
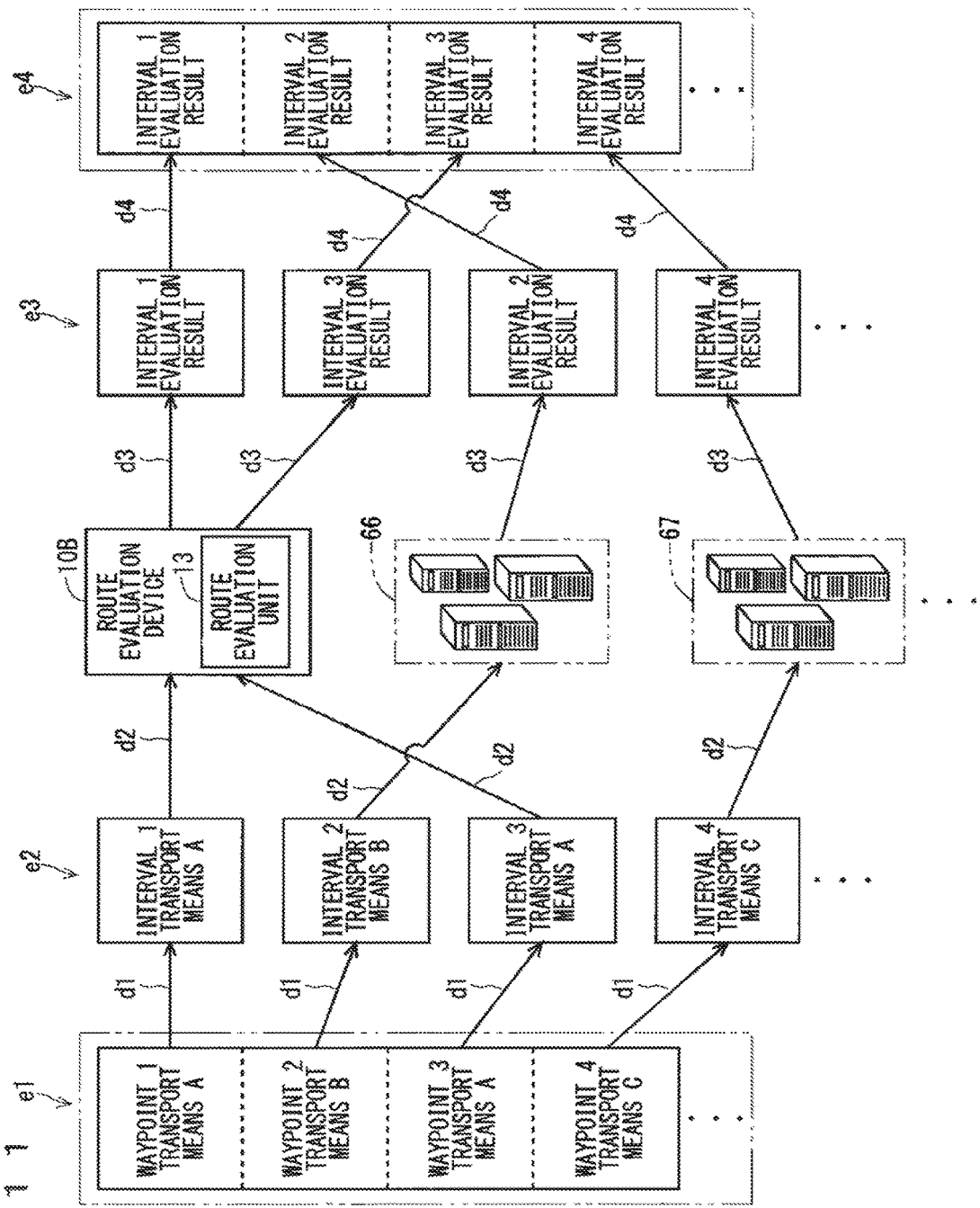
FIG. 11 is a diagram for explaining an outline of evaluation processing in the route evaluation apparatus 10B according to the fifth embodiment of the present invention.

An outline of the processing executed by the route evaluation apparatus 10B will be described next with reference to FIG. 11. FIG. 11 is a diagram for explaining an outline of evaluation processing in the route evaluation apparatus 10B according to the fifth embodiment of the present invention. For the sake of easy understanding, FIG. 11 does not show the route information acquisition unit 11 and the route reproduction unit 12.

In step d1, the route information dividing unit 51 divides a route information piece e1 generated by the route reproduction unit 12 into interval information pieces e2 according to differences in transport means.

In step d2, the route evaluation request unit 52 requests the route evaluation unit 13 or the external information processing server device 6C (66 or 67) corresponding to transport means or a transport means classification to evaluate the interval information pieces generated by the route information dividing unit 51.

In step d3, the route evaluation unit 13 and the external information processing server device 6C (66 and 67) execute the interval information evaluation requested by the route evaluation request unit 52, and provide evaluation results e3 on the interval information pieces to the route evaluation request unit 52.

In step d4, the route evaluation request unit 52 extracts an information piece concerning the evaluation result on the interval information pieces used inside the own apparatus 10B from the evaluation results e3 on the interval information pieces generated by the route evaluation unit 13 and the external information processing server device 6C.

The evaluation result combining unit 53 then generates an evaluation result e4 on one route information piece by combining the evaluation results e3 on the plurality of interval information pieces generated by the route evaluation request unit 52 according to a course.

Figure 12:
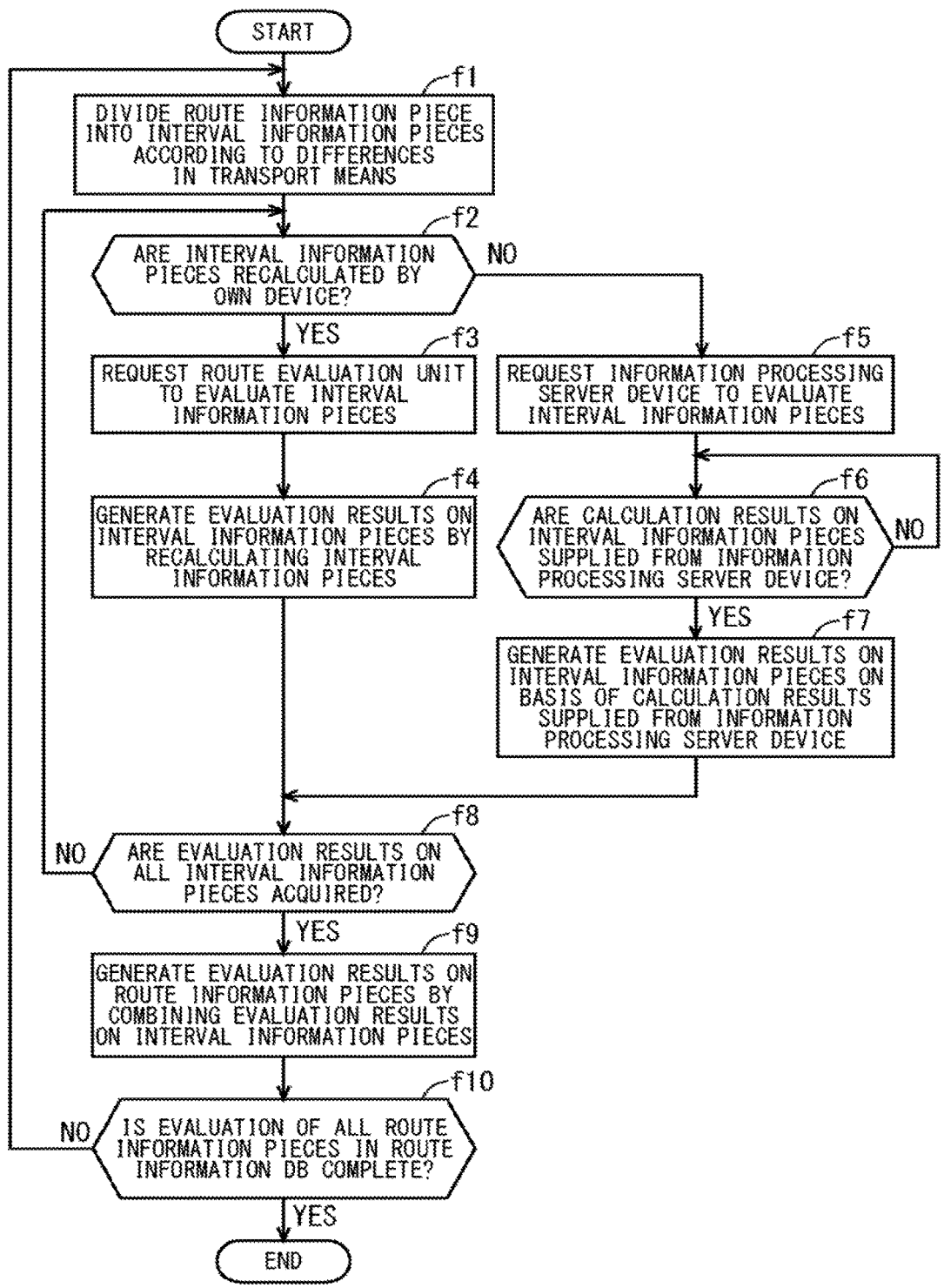
FIG. 12 is a flowchart showing a processing procedure concerning route information evaluation in the route evaluation apparatus 10B according to the fifth embodiment of the present invention.

FIG. 12 is a flowchart showing a processing procedure concerning route information evaluation in the route evaluation apparatus 10B according to the fifth embodiment of the present invention. The external information processing server device 6C, the route information dividing unit 51, the route evaluation unit 13, the route evaluation request unit 52, and the evaluation result combining unit 53 execute processes in the flowchart shown in FIG. 12. In the processing in the flowchart shown in FIG. 12, when the route reproduction unit 12 reproduces third-party route information pieces and generates route information pieces, the process shifts to step f1.

In step f1, the route information dividing unit 51 divides the route information piece generated by the route reproduction unit 12 into interval information pieces according to differences in transport means on the basis of a transport means division table. When the process in step f1 finishes, the process shifts to step f2.

A concrete example of division in step f1 will be described below with reference to FIG. 13 and FIGS. 15 to 19.

FIG. 13 is a diagram showing the route information pieces generated by the route reproduction unit 12 by reproducing third-party route information pieces in the internal format. FIG. 15 is a diagram showing the transport means division table stored in the route information dividing unit 51. The transport means division table indicates transport means classifications on the left, and transport means on the right. The table indicates that the transport means shown on the right belongs to the transport means classifications shown on the left.

FIGS. 16 to 19 are diagrams each showing the interval information pieces generated, by the route information dividing unit 51, by dividing the route information pieces shown in FIG. 13 on the basis of the transport means division table shown in FIG. 15. The route information pieces shown in FIG. 13 are sometimes referred to as "route information pieces A". The route information dividing unit 51 generates an interval information piece A1 to an interval information piece A4 by dividing the route information pieces A shown in FIG. 13 into four interval information pieces. FIG. 16 is a diagram showing the interval information piece A1. FIG. 17 shows the interval information piece A2. FIG. 18 shows the interval information piece A3. FIG. 19 shows the interval information piece A4.

Division processing in a concrete example will be described next. The route information dividing unit 51 generates the interval information piece A1 shown in FIG. 16 from waypoint 1 in the route information pieces A shown in FIG. 13 because the transport means "vehicle" corresponding to waypoint 1 and the transport means "CCC railroad" corresponding to waypoint 2 in the route information pieces A shown in FIG. 13 belong to different transport means classifications in the transport means division table shown in FIG. 15.

In the interval information piece A1, the departure place is set to "P prefecture, Q city, R town, XXX" by referring to the departure place in the route information pieces A, the destination is set to "T station" by referring to the waypoint corresponding to waypoint 1, and the transport means/classification is set to "vehicle" by referring to the transport means division table. Upon generating the interval information piece A1, the route information dividing unit 51 starts to generate the interval information piece A2.

The route information dividing unit 51 then generates the interval information piece A2 shown in FIG. 17 from waypoint 2 and waypoint 3 in the route information pieces A shown in FIG. 13 because the transport means "CCC railroad" corresponding to waypoint 2 and the transport means "DDD railroad" corresponding to waypoint 3 included in the route information pieces A shown in FIG. 13 belong to the same transport means classification in the transport means division table shown in FIG. 15.

In the interval information piece A2, like the interval information piece A1, the departure place is set to "T station" by referring to the destination in the interval information piece A1, the destination is set to "H station" by referring to the waypoint corresponding to waypoint 3, and the transport means/classification is set to "railroad" by referring to the transport means division table. In addition, because the interval information piece A2 is generated from the two waypoint information pieces, the waypoint "S station" is added by referring to the waypoint corresponding to waypoint 2. Upon generating the interval information piece A2, the route information dividing unit 51 starts to generate the interval information piece A3.

Subsequently, in the same manner, the route information dividing unit 51 generates the interval information piece A3 shown in FIG. 18 from waypoint 4 in the route information pieces A shown in FIG. 13, and generates the interval information piece A4 shown in FIG. 19 from waypoint 5 in the route information pieces A shown in FIG. 13. Note, however, that the route information dividing unit 51 sets the transport means "EEE bus" to the transport means/classification in the interval information piece A3 shown in FIG. 18 because the transport means "EEE bus" corresponding to waypoint 4 belongs to the transport means classification "others" in the transport means division table shown in FIG. 15. The route information dividing unit 51 generates the interval information pieces from the route information pieces in the above manner.

Referring back to the flowchart in FIG. 12, the route evaluation request unit 52 determines in step f2, on the basis of the route evaluation request table, whether to recalculate interval information pieces by using the own apparatus 10B. If the route evaluation request unit 52 determines that interval information pieces are recalculated by using the own apparatus 10B, the process shifts to step f3. If the route evaluation request unit 52 determines that interval information pieces are not recalculated by using the own apparatus 10B, the process shifts to step f5.

Referring to FIG. 12, in steps f3 and f4, interval information pieces are evaluated by using the route evaluation unit 13 existing in the own apparatus 10B. In steps f5 to f7, interval information pieces are evaluated by using the external information processing server device 6C.

In step f3, the route evaluation request unit 52 requests the route evaluation unit 13 to evaluate the interval information pieces. When the process in step f3 finishes, the process shifts to step f4.

In step f4, the route evaluation unit 13 generates an evaluation result on the interval information pieces by recalculating the interval information pieces. When the process in step f4 finishes, the process shifts to step f8.

In step f5, the route evaluation request unit 52 requests the external information processing server device 6C to evaluate the interval information pieces. More specifically, the route evaluation request unit 52 uses the transport means or a transport means classification in the interval information pieces to extract request destination information pieces having the corresponding transport means or transport means classification from the route evaluation request table. In addition, the route evaluation request unit 52 requests the external information processing server device 6C to evaluate the interval information pieces generated by the route information dividing unit 51 on the basis of the evaluation request information pieces included in the request destination information pieces.

More specifically, the route evaluation request unit 52 issues an interval information evaluation request by, for example, transmitting information pieces that can uniquely specify a route, such as a departure place, destination, waypoint, and departure time to the external information processing server device 6C. When the process in step f5 finishes, the process shifts to step f6.

The route evaluation apparatus 10B communicates with the external information processing server device 6C by using communication means. For example, HTTP (Hypertext Transfer Protocol), SSH (Secure Shell) that can implement secure communication, and the like may be used for Web communication. In addition, an access method for the external information processing server device 6C may use a URL (Uniform Resource Locator), IP (Internet Protocol) address, and the like for Web communication.

In step f6, the route evaluation request unit 52 determines whether it has received a calculation result on interval information pieces from the external information processing server device 6C. If the route evaluation request unit 52 determines that it has received a calculation result on interval information pieces from the external information processing server device 6C, the process shifts to step f7. If the route evaluation request unit 52 determines that it has not received any calculation result on interval information pieces from the external information processing server device 6C, the process stands by until a calculation result on interval information pieces are supplied from the external information processing server device 6C.

In step f7, the route evaluation request unit 52 generates an evaluation result on the interval information pieces on the basis of the calculation result supplied from the external information processing server device 6C. More specifically, the route evaluation request unit 52 generates an evaluation result on the interval information pieces by extracting specific items from the evaluation result on the interval information pieces generated by the external information processing server device 6C on the basis of evaluation extraction information pieces, and converting the units of the items. When the process in step f7 finishes, the process shifts to step f8.

In step f8, the route evaluation request unit 52 determines that it has received evaluation results on all the interval information pieces. If the route evaluation request unit 52 determines that it has acquired evaluation results on all the interval information pieces, the process shifts to step f9. If the route evaluation request unit 52 determines that it has not acquired evaluation results on all the interval information pieces, the process shifts to step f2.

In step f9, the evaluation result combining unit 53 generates an evaluation result on the route information pieces by combining evaluation results on the interval information pieces.

FIGS. 20 and 21 are diagrams showing the route evaluation request tables stored in the route evaluation request unit 52. The route evaluation request tables include route evaluation request table 1 representing evaluation request information pieces and route evaluation request table 2 representing evaluation extraction information pieces. FIG. 20 shows route evaluation request table 1. FIG. 21 shows route evaluation request table 2. Route evaluation request table 1 and route evaluation request table 2 may be integrated into one table.

Route evaluation request table 1 and route evaluation request table 2 each have transport means or a transport means classification as a key for identifying a specific line in the table. Route evaluation request table 1 includes transport means or transport means classifications, the service names of the external information processing server devices 6C, request destination addresses for requesting for interval information evaluations, and required items required for request destination addresses. Route evaluation request table 2 includes transport means or transport means classifications, transport means transfer times representing the times required for transfer set for each of the transport means, and extraction items representing specific items to be extracted from the evaluation results generated by the external information processing server devices 6C.

FIGS. 22 to 25 are diagrams showing evaluation results on the interval information pieces generated by the route evaluation request unit 52. Evaluation processing in a concrete example will be described. First of all, the route evaluation request unit 52 evaluates the interval information piece A1 of the interval information generated by the route information dividing unit 51 on the basis of the course in the route information pieces. The transport means/classification in the interval information piece A1 is "vehicle", and the request destination is "own apparatus" according to route evaluation request table 1. Accordingly, the route evaluation request unit 52 requests the route evaluation unit 13 to evaluate the interval information piece A1.

The route evaluation unit 13 generates an evaluation result on the interval information piece A1 by evaluating the interval information piece A1 on the basis of an evaluation criterion storage unit 14. When the evaluation of the interval information piece A1 by the route evaluation unit 13 is complete, the route evaluation request unit 52 starts to evaluate the interval information piece A2 next to the interval information piece A1.

Because the transport means/classification in the interval information piece A2 is "railroad", the route evaluation request unit 52 obtains the service name "HHH railroad service" in the external information processing server device 6C and the request destination "http://HHH.Express.xxxx/" in the external information processing server device 6C by referring to the line on which the transport means/classification is "railroad" in route evaluation request table 1.

The items required to access the external information processing server device 6C include the departure place "source", destination "destination", waypoint "waypoint", and departure time "arrival" according to the required items included in route evaluation request table 1. Accordingly, the route evaluation request unit 52 combines each item with a URL and transmits the resultant information piece to the external information processing server device 6C. For example, because the departure place in the interval information piece A2 is "T station", the route evaluation request unit 52 couples "source=T station" to "http://HHH.Express.xxxx/" to generate "http://HHH.Express.xxxx/?source=T station& . . . ".

In addition, the route evaluation request unit 52 sets, as a departure time, the value obtained by adding the moving time "5 min" included in the evaluation result on the interval information piece A1 preceding the interval information piece A2 and the means-of-transportation transfer time "3 min" in route evaluation request table 2. The route evaluation request unit 52 accesses the external information processing server device 6C by using the URL generated by the above method.

The external information processing server device 6C calculates a route in consideration of a departure place, destination, waypoint, and departure time by analyzing the URL generated by the route evaluation request unit 52. As a result, the external information processing server device 6C generates route information pieces indicating that the user departs at the departure time requested by the route evaluation request unit 52 and passes through the departure place, destination, and waypoint, and also transmits the route information pieces to the route evaluation request unit 52.

The format of the route information pieces generated by the external information processing server device 6C may be HTML (Hyper Text Markup Language), XML (Extensible Markup Language), JSON (JavaScript (registered trademark) Object Notation), or the like used on the Web.

The route evaluation request unit 52 generates an evaluation result on the interval information piece A2 by analyzing the route information pieces generated by the external information processing server device 6C and extracting each of the evaluation values on the basis of the extraction items written on route evaluation request table 2. Upon completing the evaluation of the interval information piece A2, the route evaluation request unit 52 starts to evaluate the interval information piece A3 next to the interval information piece A2.

The route evaluation request unit 52 generates an evaluation result on the interval information piece A3 and an evaluation result on the interval information piece A4 by evaluating the interval information piece A3 and the interval information piece A4 in the same manner as the interval information piece A1 and the interval information piece A2. Upon completing the evaluation of the interval information piece A1 to interval information piece A4, the route evaluation request unit 52 terminates the processing. The process then shifts to processing in the evaluation result combining unit 53.

Referring back to the flowchart of FIG. 12, it is determined in step f10 whether the evaluation of all the route information pieces in the route information database is complete. If it is determined that the evaluation of all the route information pieces in the route information database is complete, the entire processing procedure finishes. If it is determined that the evaluation of all the route information pieces in the route information database is not complete, the process returns to step f1.

A concrete example of a combining operation in step f10 will be described with reference to FIG. 14 and FIGS. 22 to 25. FIG. 14 is a diagram showing an evaluation result on the interval information piece A1 which is generated by the evaluation result combining unit 53. Combining processing in the concrete example will be described. The evaluation result combining unit 53 generates an evaluation result on the route information pieces A by adding evaluation values concerning the same items as those included in evaluation results on the interval information piece A1 to the interval information piece A4.

For example, the evaluation result combining unit 53 generates the moving distance "55 km" included in the evaluation result on the route information pieces A by adding up the moving distances included in the evaluation results on each of the interval information pieces. In addition, the evaluation result combining unit 53 needs to consider transport means transfer times to generate the moving time included in the evaluation result on the route information pieces A.

The evaluation result combining unit 53 obtains the moving time "118 min" of the evaluation result on the route information pieces A by adding up the total transfer time acquired from the route evaluation request unit 52 and the moving times of the evaluation results on all the interval information pieces. The evaluation result combining unit 53 performs the same operation concerning a moving cost. The evaluation result combining unit 53 generates an evaluation result on the interval information piece A by performing calculation concerning all the items in all the interval information pieces. The route evaluation combining unit 53 then terminates the processing.

A concrete example of the processing result obtained by an information processing device 10C will be described with reference to FIGS. 13 and 14. The information processing device 10C generates an evaluation result on the route information pieces A shown in FIG. 14 from the route information pieces A shown in FIG. 13 by executing processing from step f1 to step f9 in FIG. 12. The comparison between the route information pieces A and the evaluation result on the route information pieces A reveals that the evaluation values for a moving distance, moving time, and moving cost change. This is because each evaluation value of route information pieces becomes a normalized value after evaluation by the route evaluation unit 13 or the external information processing server device 6C.

The information processing device 10C generates evaluation results normalized between a plurality of route information pieces by executing steps f1 to f9 with respect to the plurality of route information pieces having a plurality of transport means, and displays the evaluation results on the plurality of route information pieces to the user. This allows the user to fairly compare the plurality of route information pieces having the plurality of transport means.

In the concrete examples concerning the evaluation processing for the route information pieces in FIGS. 13 to 25, the moving distance, moving time, and moving cost are written as evaluation items. However, evaluation items may be added or changed. Evaluation items in evaluation processing for route information pieces may include, for example, a travel distance, ride distance, transfer moving distance, travel time, ride time, transfer time, departure time, arrival time, required cost, fuel consumption, congestion degree, exercise quantity, and stair-ascending/descending count.

In addition, constraint conditions concerning route evaluation may be added to the waypoint information pieces of route information pieces. The constraint conditions include, for example, a transfer time, transfer distance, parking fee, departure time, and train type.

In the concrete example of the route information dividing unit 51, transport means types such as "bus" and "railroad" each are written as a transport means classification of the transport means division table. However, it is possible to use classifications such as "bus 1", "bus 2", and "railroad and bus". The transport means division table is used for gathering a plurality of transport means into one group, generating interval information having a plurality of transport means, and requesting one information processing server device to perform evaluation.

In the concrete example of the route evaluation request unit 52, each interval information evaluation result includes a departure place, destination, waypoint, moving distance, moving time, and moving cost. However, items may be added or changed.

In addition, in the concrete example of the route evaluation request unit 52, in evaluating interval information pieces having transport means with punctuality requiring a departure time, a departure time is calculated from a departure time at a departure place, the moving time in former interval information pieces, and a transfer time. However, it is possible to set, as a departure time, the value obtained by adding an arrival time to the evaluation result in former interval information pieces and adding the arrival time in former interval information pieces and a transfer time to the resultant value.

Furthermore, the method of issuing a request from the route evaluation request unit 52 to an information processing server device is expressed by URL access based on HTTP. However, another method may be used or a plurality of access methods may be mixed.

In the concrete example of the evaluation result combining unit 53, the calculation of an evaluation result by addition has been exemplified. However, this method may be changed to a calculation method suitable for the items to be evaluated. The calculation method to be used by the evaluation result combining unit 53 may include, for example, a calculation method of acquiring a maximum value or minimum value and a calculation method of acquiring the average or variance of each of the evaluation results.

In addition, the evaluation result on route information pieces generated by the evaluation result combining unit 53 may include not only evaluation values but also the detailed items generated by the route evaluation unit 13 and the external information processing server devices 6C.

This embodiment is provided with the route information dividing unit 51, the route evaluation request unit 52, and the evaluation result combining unit 53 to implement route information evaluation processing also in the external information processing server devices 6C, in addition to the components of the information providing device 2 according to the first embodiment.

In route information evaluation processing, the route information dividing unit 51 divides route information pieces into a plurality of interval information pieces for each transport means, and the route evaluation request unit 52 requests the route evaluation unit 13 or the external information processing server device 6C corresponding to each transport means to evaluate each interval information piece, thereby generating an evaluation result on the interval information pieces. The evaluation result combining unit 53 then generates an evaluation result on the route information pieces by combining the evaluation results on the plurality of interval information pieces according to the course.

With this operation, in evaluating route information pieces having transport means which the route evaluation apparatus 1 cannot correctly evaluate, the interval information pieces obtained by dividing the route information pieces according to transport means are evaluated by the corresponding external information processing server device 6C for each transport means, and the evaluation results are combined to generate an evaluation result on the route information pieces. It is therefore possible to correctly evaluate even route information pieces with a complicated route including a plurality of transport means.

As described above, according to this embodiment, route information pieces are acquired from the plurality of external database devices 90, 91, 92, . . . and evaluated. The route evaluation apparatus 10B includes the route information acquisition unit 11, the route reproduction unit 12, the evaluation criterion storage unit 14, the route evaluation unit 13, and the display control unit 15. The route information acquisition unit 11 acquires route information pieces from each of the external database devices 90, 91, 92, . . . , and the route reproduction unit 12 reproduces the route information pieces in the format used inside the route evaluation apparatus 10B.

The route evaluation unit 13 evaluates the plurality of route information pieces generated by reproduction by the route reproduction unit 12 on the basis of the evaluation criteria stored in the evaluation criterion storage unit 14. The display control unit 15 controls the display unit 21 such that the display unit 21 displays the evaluation result on each route information pieces which is generated by evaluation by the route evaluation unit 13. Each of the route information pieces includes waypoint information pieces. The route evaluation unit 13 generates, based on the evaluation criterion, an evaluation result by calculating a time and a distance concerning a route including the waypoint represented by the waypoint information pieces.

In this manner, the display control unit 15 controls the display unit 21 such that the display unit 21 displays the evaluation results obtained by evaluating the plurality of route information pieces acquired from the plurality of external database devices 90, 91, 92, ... on the basis of the same criteria. With this operation, the display unit 21 displays the evaluation results obtained by evaluating a plurality of route information pieces on the basis of the same criteria. This allows the user to fairly compare and evaluate the plurality of route information pieces acquired from the plurality of external database devices 90, 91, 92, ..... This can improve the reliability of the route evaluation apparatus 10B.

The third-party Web server devices 60, 61, 62, 63, 64, ... according to the first to fourth embodiments may be replaced by the external database devices 90, 91, 92, ....

In addition, the third-party Web server device 65 according to the fourth embodiment may be replaced by the information processing server devices 66, 67, ... according to the fifth embodiment.

Note that each of the embodiments of the present invention can be freely combined within the scope of the present invention. In addition, any given constituent elements of each embodiment can be changed or omitted as needed.

Although the present invention has been described in detail, the above description is exemplary in all the aspects, and the present invention is not limited to this. Although not exemplified, it should be understood that an infinite number of modifications can be contrived without deviating from the scope of the present invention.

EXPLANATION OF REFERENCE SIGNS LIST 1, 10, 10A, 10B: route evaluation apparatus
2, 3, 3A, 3B, 3C: information providing device
6, 6A, 6B, 61, 62, 63, 64, 65: third-party Web server device
6C, 66, 67: external information processing server device
8: network
9C, 90, 91, 92: external database device
11: route information acquisition unit
12: route reproduction unit
13: route evaluation unit
14: evaluation criterion storage unit
15: display control unit
20: input unit
30: information DB
31: map information DB
32: traffic information DB
33: traffic information acquisition unit
40: route evaluation processing unit
41: route information DB
50: route reproduction request unit
51: route information dividing unit
52: route evaluation request unit
53: evaluation result combining unit
71: input I/F
72: output I/F
73, 611: HDD device
74, 614: communication I/F
75, 612: processing circuit
76, 614: memory
77: sensor
100, 100A, 100B, 100C: information providing system

The invention claimed is:

1. A route evaluation apparatus for acquiring and evaluating route information pieces concerning routes from a plurality of external database devices installed outside, the route evaluation apparatus comprising:
a processor to execute a program; and
a memory to store the program which, when executed by the processor, performs:
a route information acquisition process of acquiring said route information pieces from each of said external database devices;
a route reproduction process of reproducing each of said route information pieces acquired by said route information acquisition process in a format used inside an own apparatus;
a route information dividing process of dividing said route information pieces generated by the reproduction by said route reproduction process into interval information pieces according to differences in transport means for each of the waypoints from a departure place to a destination;
a route evaluation request process of deciding a processing unit to evaluate said interval information pieces in accordance with said transport means in said interval information pieces and requests the decided processing unit to evaluate said interval information pieces;
an evaluation criterion storage process of storing evaluation criteria for evaluating said interval information pieces generated by said route information dividing process;
a route evaluation process of evaluating said interval information pieces generated by said route information dividing process based on said evaluation criteria stored in said evaluation criterion storage process;
an evaluation result combining process of generating an evaluation result on said route information pieces by combining evaluation results on each of said interval information pieces, the evaluation results being generated by said processing unit in accordance with a request issued by said route evaluation request process; and
a display control process of controlling a display such that said display displays an evaluation result on each of said route information pieces, the evaluation result being generated by combining by said evaluation result combining process,
wherein each of said route information pieces includes a waypoint information piece concerning a waypoint on each of the routes from the departure place to the destination,
said route information pieces include information pieces of transport means for said waypoint,
said processing unit is decided by said route evaluation request process from a plurality of external information processing server devices and said route evaluation process that are set for each of said transport means, and
said decided processing unit generates said evaluation result by calculating a time and a distance concerning a route including a waypoint represented by said waypoint information piece based on said evaluation criteria.

2. The route evaluation apparatus according to claim 1, wherein each of said route information pieces generated by reproduction by said route reproduction process includes said transport means between said waypoints that are consecutive, and said route information dividing process includes transport means classification information pieces for classifying transport means classifications including at least one or more transport means of said transport means, and generates, as one of said interval information pieces, a route having said transport means belonging to said same transport means classification and represented by said plurality of waypoints that are consecutive, based on said transport means classification information pieces.

3. The route evaluation apparatus according to claim 1, wherein said route evaluation request process includes request destination information pieces which are set for each of said transport means or each of transport means classifications including at least one or more transport means of said transport means to issue a request to evaluate said interval information pieces, and decides said processing unit that issues a request to evaluate said interval information pieces generated by said route information dividing process in accordance with said transport means or said transport means classifications based on said request destination information pieces, and said request destination information pieces include said transport means or said transport means classifications and evaluation request information pieces for requesting said external information processing server devices to evaluate the interval information pieces.

4. The route evaluation apparatus according to claim 3, wherein said request destination information pieces include evaluation extraction information pieces for extracting information pieces from said evaluation results generated by said external information processing server devices, and said evaluation results on said interval information pieces which are used inside the own apparatus is generated by said route evaluation request process by extracting evaluation items included in the request destination information pieces from said evaluation results on said interval information pieces which are generated by said external information processing server devices based on said evaluation extraction information pieces.

5. The route evaluation apparatus according to claim 1, wherein evaluation of said interval information pieces is requested by said route evaluation request process in order from a departure place to a destination, and in evaluating said interval information pieces including said transport means with punctuality requiring a departure time, a departure time used for evaluation of said interval information pieces is generated by said route evaluation request process by acquiring an arrival time from said waypoint information pieces and a transfer time set for said each of transport means classifications including at least one or more transport means of said transport means, and adding said acquired arrival time to said acquired transfer time.

6. The route evaluation apparatus according to claim 1, wherein an evaluation result on one of said route information pieces is generated by said evaluation result combining process from said evaluation results on said plurality of interval information pieces by combining, for each of the items, numerical values concerning times and distances included in the evaluation results on each of said interval information pieces which are generated by said route evaluation request process.

7. A route evaluation method of acquiring and evaluating route information pieces concerning routes from a plurality of external database devices, the route evaluation method comprising:

acquiring said route information pieces including waypoint information pieces concerning waypoints on said routes from a departure place to a destination from each of said external database devices;

reproducing each of said acquired route information pieces in a format used inside a route evaluation apparatus;

dividing said reproduced route information pieces into interval information pieces according to differences in transport means for each of the waypoints from a departure place to a destination;

deciding a processing unit to evaluate said interval information pieces in accordance with said transport means in said interval information pieces and requesting the decided processing unit to evaluate said interval information pieces;

performing an evaluation of each of said interval information pieces using the respective decided processing unit and generating evaluation results therefrom;

generating an evaluation result on said route information pieces by combining the evaluation results on each of said interval information pieces, the evaluation results being generated by said processing unit in accordance with a request; and controlling a display such that the display displays the evaluation result on each of said route information pieces, the evaluation result being generated by the combining.

* * * * *